United States Patent
Endo et al.

(10) Patent No.: US 7,518,636 B2
(45) Date of Patent: Apr. 14, 2009

(54) IMAGE PROCESSING APPARATUS AND IMAGE PROCESSING METHOD

(75) Inventors: Takaaki Endo, Chiba (JP); Akihiro Katayama, Kanagawa (JP); Masahiro Suzuki, Kanagawa (JP); Daisuke Kotake, Kanagawa (JP); Yukio Sakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 10/779,791

(22) Filed: Feb. 18, 2004

(65) Prior Publication Data

US 2004/0183898 A1    Sep. 23, 2004

(30) Foreign Application Priority Data

Feb. 21, 2003    (JP)    ............................. 2003-044488
Sep. 11, 2003    (JP)    ............................. 2003-319808

(51) Int. Cl.
   *H04N 5/228* (2006.01)
(52) U.S. Cl. ................................. 348/208.99; 382/154
(58) Field of Classification Search ....................... None
   See application file for complete search history.

(56) References Cited

U.S. PATENT DOCUMENTS

| | | | |
|---|---|---|---|
| 4,851,897 A | 7/1989 | Inuma et al. | 358/29 |
| 5,255,077 A | 10/1993 | Yamazaki et al. | 358/29 |
| 6,122,078 A * | 9/2000 | Leberl et al. | 358/474 |
| 6,335,754 B1 | 1/2002 | Endo et al. | 348/37 |
| 6,449,013 B1 | 9/2002 | Suzuki et al. | 348/279 |
| 7,015,954 B1 * | 3/2006 | Foote et al. | 348/218.1 |
| 2003/0107569 A1 | 6/2003 | Endo et al. | 345/419 |
| 2003/0234868 A1 | 12/2003 | Katayama | 348/207.1 |

FOREIGN PATENT DOCUMENTS

JP    11-168754    6/1999

OTHER PUBLICATIONS

Hirose, et al., "Building Image-Based Cybercities by Using Vehicle-Mounted Cameras(2)—Generation of Wide-Range Virtual Environment by Using Photorealistic Images", Proceedings of the Virtual Reality Society of Japan Annual Conference (1997).

(Continued)

*Primary Examiner*—Sinh Tran
*Assistant Examiner*—Yogesh Aggarwal
(74) *Attorney, Agent, or Firm*—Fitzpatrick, Cella, Harper & Scinto

(57) ABSTRACT

Shakiness of a panoramic video can be reduced by an image processing method comprising: setting a common coordinate system which can be transformed from individual coordinate systems of a plurality of image sensing devices; estimating postures of at least one of the plurality of image sensing devices; calculating an estimated posture of the common coordinate system using at least one of the estimated posture of the plurality of image sensing devices; calculating a correction transform for reducing a shakiness of the common coordinate system using the estimated posture of the common coordinate system; calculating a correction transform for reducing a shakiness of each of the plurality of image sensing devices using the correction transform; applying the corresponding correction transform to a sensed image which is sensed by each of the plurality of image sensing devices; and composing a panoramic image by joining a plurality of transformed sensed images.

6 Claims, 17 Drawing Sheets

OTHER PUBLICATIONS

Endo, et al., "Building Image-Based Cybercities by Using Vehicle-Mounted Cameras", Human Interface News and Report, vol. 12, No. 2, pp. 157-162 (1997).

"Building Image-Based Cybercities by Using Vehicle-Mounted Cameras", T. Endo, et al., pp. 276 to 277, 1997.

Building Image-Based Cybercities by Using Vehicle-Mounted Cameras(2) Generation of Wide-Range Virtual Environment by Using Photorealistic Images, M. Hirose, et al., pp. 67 to 70, 1997.

* cited by examiner

IMAGE PROCESSING APPARATUS AND IMAGE PROCESSING METHOD

FIELD OF THE INVENTION

The present invention relates to an image processing apparatus and image processing method, which applies an image process to a plurality of images.

BACKGROUND OF THE INVENTION

An attempt has been made to sense a real space by an image sensing apparatus mounted on a mobile object, and to express the sensed real space as a virtual space using a computer on the basis of the sensed photo-realistic image data (see, e.g., Endo, Katayama, Tamura, Hirose, Watanabe, & Tanikawa: "Method of Generating Image-Based Cybercities By Using Vehicle-Mounted Cameras" (IEICE Society, PA-3-4, pp. 276-277, 1997), or Hirose, Watanabe, Tanikawa, Endo, Katayama, & Tamura: "Building Image-Based Cybercities By Using Vehicle-Mounted Cameras(2)-Generation of Wide-Range Virtual Environment by Using Photo-realistic Images-" (Proc. of the Virtual Reality Society of Japan, Vol.2, pp. 67-70, 1997), etc.).

As a method of expressing a sensed real space as a virtual space on the basis of photo-realistic image data sensed by an image sensing apparatus mounted on a mobile, a method of reconstructing a geometric model of the real space on the basis of the photo-realistic image data, and expressing the virtual space using a conventional CG technique is known. However, this method has limits in terms of the accuracy, exactitude, and reality of the model. On the other hand, an Image-Based Rendering (IBR) technique, that expresses a virtual space using a photo-realistic image without any reconstruction using a model, has attracted attention. The IBR technique composes an image viewed from an arbitrary viewpoint on the basis of a plurality of photo-realistic images. Since the IBR technique is based on photo-realistic images, it can express a realistic virtual space.

In order to create a virtual space that allows walkthrough using such IBR technique, an image must be composed and presented in correspondence with the position in the virtual space of the user. For this reason, in such systems, respective frames of photo-realistic image data and positions in the virtual space are saved in correspondence with each other, and a corresponding frame is acquired and reproduced on the basis of the user's position and visual axis direction in the virtual space.

As a method of acquiring position data in a real space, a positioning system using an artificial satellite such as GPS (Global Positioning System) used in a car navigation system or the like is generally used. As a method of determining correspondence between position data obtained from the GPS or the like and photo-realistic image data, a method of determining the correspondence using a time code has been proposed (Japanese Patent Laid-Open No. 11-168754). With this method, the correspondence between respective frame data of photo-realistic image data and position data is determined by determining the correspondence between time data contained in the position data, and time codes appended to the respective frame data of photo-realistic image data.

The walkthrough process in such virtual space allows the user to view a desired direction at each position. For this purpose, images at respective viewpoint positions may be saved as a panoramic image that can cover a broader range than the field angle upon reproduction, a partial image to be reproduced may be extracted from the panoramic image on the basis of the user's position and visual axis direction in the virtual space, and the extracted partial image may be displayed.

When the image sensing apparatus is shaken, a panoramic image is also shaken. In such case, when shakiness of the image sensing apparatus is prevented by physical means such as a special vibration isolation device, rail, or the like, the image sensing apparatus cannot be freely moved, and the image sensing conditions are restricted. It is impossible in principle for the method using such physical means to reduce shakiness of the already sensed video.

When a video image process is used, shakiness of the already sensed video can be reduced. For example, when feature points in an image are detected, and are traced across a plurality of frames, the position and posture of a camera can be estimated on the basis of a set of the traced feature points by geometric calculations such as factorization or the like. Conventionally, such estimation of the position and posture of the camera can be implemented using commercially available match moving software. If the position and posture of the camera in each frame of the video can be estimated, a shakiness of the video can be reduced on the basis of the obtained estimated values of the position and posture of the camera.

The video image process using match moving software or the like, however, cannot simultaneously estimate the positions and postures of a plurality of cameras. Also, the estimated values of the position and posture of the camera calculated by the video image process contain errors. For this reason, when shakiness of images sensed by a plurality of cameras are reduced by the video image process for each camera, and the processed images are stitched to form a single panoramic image, the degree of overlapping of the seams between neighboring images varies for respective frames.

SUMMARY OF THE INVENTION

The present invention has been made in consideration of the aforementioned problems, and has as its principal object to reduce a shakiness of a panoramic video.

According to an aspect of the present invention, an image processing method comprising: setting a common coordinate system which can be transformed from individual coordinate systems of a plurality of image sensing devices; estimating postures of at least one of the plurality of image sensing devices; calculating an estimated posture of the common coordinate system using at least one of the estimated posture of the plurality of image sensing devices; calculating a correction transform for reducing a shakiness of the common coordinate system using the estimated posture of the common coordinate system; calculating a correction transform for reducing a shakiness of each of the plurality of image sensing devices using the correction transform; applying the corresponding correction transform to a sensed image which is sensed by each of the plurality of image sensing devices; and composing a panoramic image by joining a plurality of transformed sensed images.

According to another aspect of the present invention, an image processing method comprising: setting a common coordinate system which can be transformed from individual coordinate systems of a plurality of image sensing devices; estimating postures of at least one of the plurality of image sensing devices; calculating an estimated posture of the common coordinate system using at least one of the estimated posture of the plurality of image sensing devices; calculating a correction transform for reducing a shakiness of the common coordinate system using the estimated posture of the common coordinate system; composing a panoramic image by joining a plurality of sensed images, which are sensed by the plurality of image sensing devices; and applying the correction transform for reducing a shakiness of the common coordinate system to the panoramic image.

According to a further aspect of the present invention, an image processing apparatus comprising: setting unit adapted to set a common coordinate system which can be transformed from individual coordinate systems of a plurality of image sensing devices; estimation unit adapted to estimate postures of at least one of the plurality of image sensing devices; first calculation unit adapted to calculate an estimated posture of the common coordinate system using at least one of the estimated posture of the plurality of image sensing devices; second calculation unit adapted to calculate a correction transform for reducing a shakiness of the common coordinate system using the estimated posture of the common coordinate system; third calculation unit adapted to calculate a correction transform for reducing a shakiness of each of the plurality of image sensing devices using the correction transform; application unit adapted to apply the corresponding correction transform to a sensed image which is sensed by each of the plurality of image sensing devices; and composition unit adapted to compose a panoramic image by joining a plurality of transformed sensed images.

According to still further aspect of the present invention, an image processing apparatus comprising: setting unit adapted to set a common coordinate system which can be transformed from individual coordinate systems of a plurality of image sensing devices; estimation unit adapted to estimate postures of at least one of the plurality of image sensing devices; first calculation unit adapted to calculate an estimated posture of the common coordinate system using at least one of the estimated posture of the plurality of image sensing devices; second calculation unit adapted to calculate a correction transform for reducing a shakiness of the common coordinate system using the estimated posture of the common coordinate system; composition unit adapted to compose a panoramic image by joining a plurality of sensed images, which are sensed by the plurality of image sensing devices; and application unit adapted to apply the correction transform for reducing a shakiness of the common coordinate system to the panoramic image.

According to yet further aspect of the present invention, a computer program for making a computer function as an image processing apparatus of the present invention or a computer readable storage medium storing the computer program.

According to another aspect of the present invention, an imaging apparatus comprising: a plurality of image sensing devices; a processor for composing a stabilized panoramic image; and a display device for displaying the panoramic image, wherein the processor composes the panoramic image by performing the steps of: setting a common coordinate system which can be transformed from individual coordinate systems of a plurality of image sensing devices; estimating postures of at least one of the plurality of image sensing devices; calculating an estimated posture of the common coordinate system using at least one of the estimated posture of the plurality of image sensing devices; calculating a correction transform for reducing a shakiness of the common coordinate system using the estimated posture of the common coordinate system; calculating a correction transform for reducing a shakiness of each of the plurality of image sensing devices using the correction transform; applying the corresponding correction transform to a sensed image which is sensed by each of the plurality of image sensing devices; and composing the stabilized panoramic image by joining a plurality of transformed sensed images.

According to a further aspect of the present invention, an imaging apparatus comprising: a plurality of image sensing devices; a processor for composing a stabilized panoramic image; and a display device for displaying the panoramic image, wherein the processor composes the panoramic image by performing the steps of: setting a common coordinate system which can be transformed from individual coordinate systems of the plurality of image sensing devices; estimating postures of at least one of the plurality of image sensing devices; calculating an estimated posture of the common coordinate system using at least one of the estimated posture of the plurality of image sensing devices; calculating a correction transform for reducing a shakiness of the common coordinate system using the estimated posture of the common coordinate system; composing a panoramic image by joining a plurality of sensed images, which are sensed by the plurality of image sensing devices; and applying the correction transform for reducing a shakiness of the common coordinate system to the panoramic image in order to compose the stabilized image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Note that an image processing method to be explained in the following embodiments can be implemented by executing a computer program that implements that image processing method by an image processing apparatus as a computer apparatus.

First Embodiment

This embodiment will explain an image processing method which reduces shakiness using posture information of a virtual panoramic camera, which is calculated based on posture information of a plurality of cameras, upon displaying a panoramic video.

Figure 4:
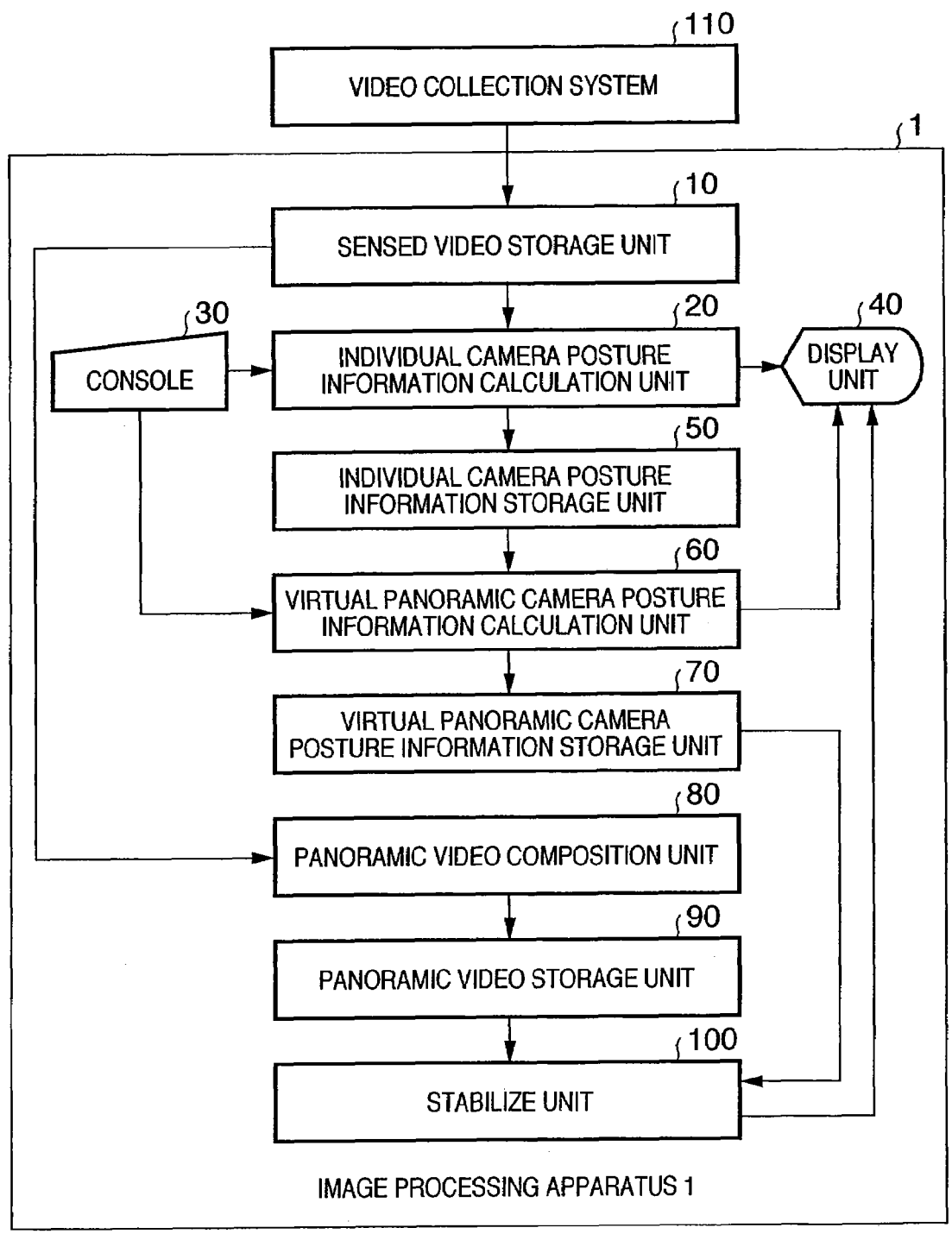
FIG. 4 is a block diagram for explaining the functional arrangement of a panoramic video generation system according to the first embodiment.

A panoramic video generation system according to this embodiment will be described below. FIG. 4 is a block diagram for explaining the functional arrangement of the panoramic video generation system according to this embodiment. This system includes a video collection system 110 and image processing apparatus 1. The image processing apparatus 1 comprises a sensed video storage unit 10, individual camera posture information calculation unit 20, console 30, display unit 40, individual camera posture information storage unit 50, virtual panoramic camera posture information calculation unit 60, virtual panoramic camera posture information storage unit 70, panoramic video composition unit 80, panoramic video storage unit 90, and stabilize unit 100.

The sensed video storage unit 10 stores a photo-realistic video captured by the video collection system 110 to be described later in a storage device such as a hard disk drive or the like.

The individual camera posture information calculation unit 20 calculates posture information of each frame of the video stored in the sensed video storage unit 10. Details of the process will be explained later.

The console 30 is used by the user of this system to input instructions and the like to the system, and comprises input devices such as a mouse, keyboard, and the like. The aforementioned individual camera posture information calculation unit 20 sets camera parameters and the like in accordance with operation inputs from the console 30 while observing a display on the display unit 40.

The camera posture information storage unit 50 stores the posture information of each camera calculated by the individual camera posture information calculation unit 20.

The virtual panoramic camera posture information calculation unit 60 calculates posture information of the virtual panoramic camera by combining the posture information of the respective cameras stored in the individual camera posture information storage unit 50. Details of the process will be explained later.

The virtual panoramic camera posture information storage unit 70 stores the posture information of the virtual panoramic camera calculated by the virtual panoramic camera posture information calculation unit 60.

The panoramic video composition unit 80 composites a panoramic video by stitching video frames of the same time instant stored in the sensed video storage unit 10. Details of the process will be explained later.

The panoramic video storage unit 90 stores the panoramic video composed by the panoramic video composition unit 80.

The stabilize unit 100 reduces shakiness of the panoramic video stored in the panoramic video storage unit 90 using the posture information of the virtual panoramic camera stored in the virtual panoramic camera posture information storage unit 70, and displays that video on the display unit 40.

Figure 5:
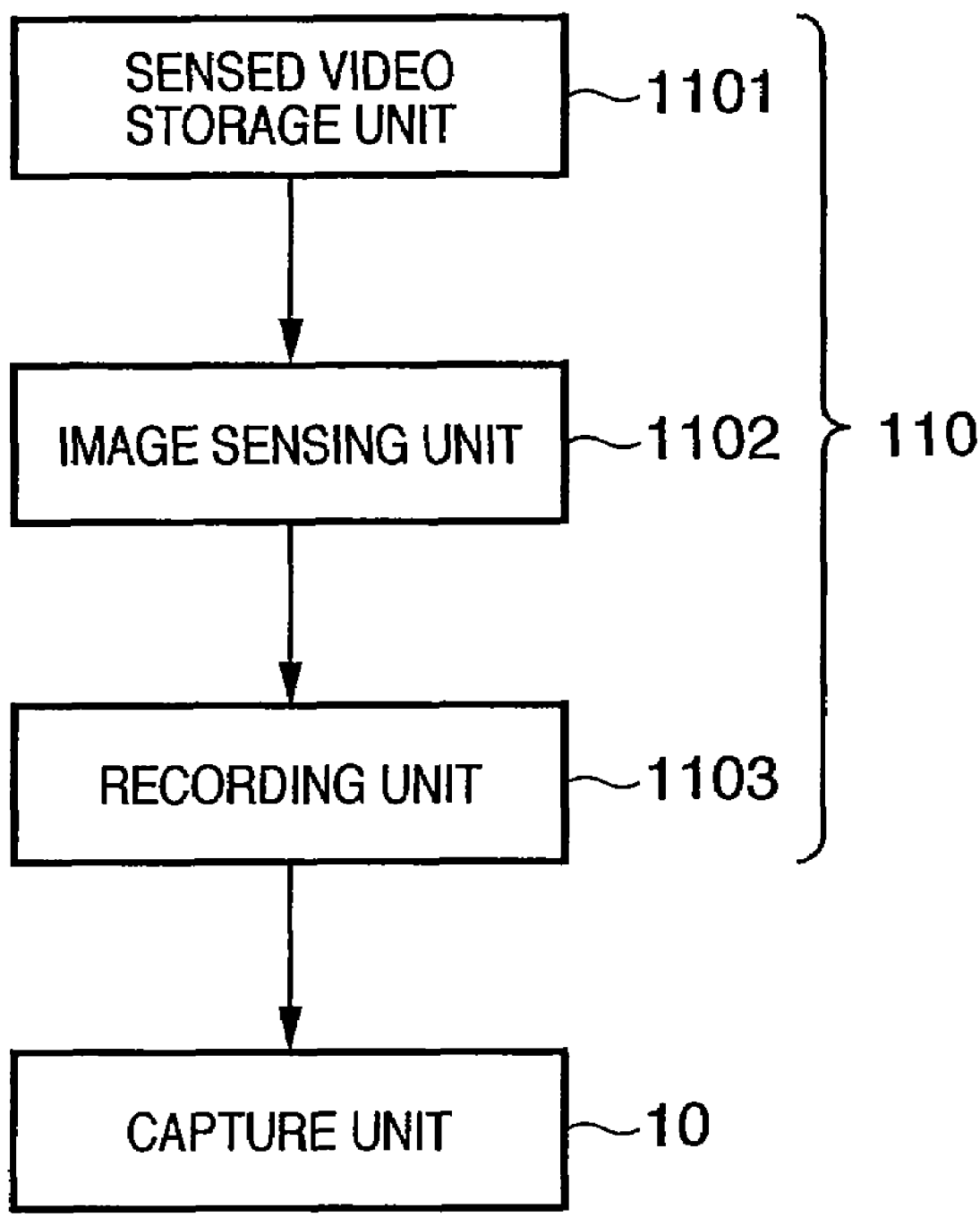
FIG. 5 is a block diagram showing an example of the arrangement of a video data collection system 110 used to collect videos to be saved in a sensed video storage unit 10.

FIG. 5 is a block diagram showing an example of the arrangement of the video collection system 110 used to collect video data to be saved in the sensed video storage unit 10. As shown in FIG. 5, the video collection system 110 comprises three units, i.e., an image sensing unit 1101, recording unit 1102, and capture unit 1103. The image sensing unit 1101 is used to sense a surrounding scene while moving. The recording unit 1102 is used to record a video output from the image sensing unit 1101. The capture unit 1103 is used to store the collected video data in the sensed video storage unit 10 in the image processing apparatus 1.

Figure 6:
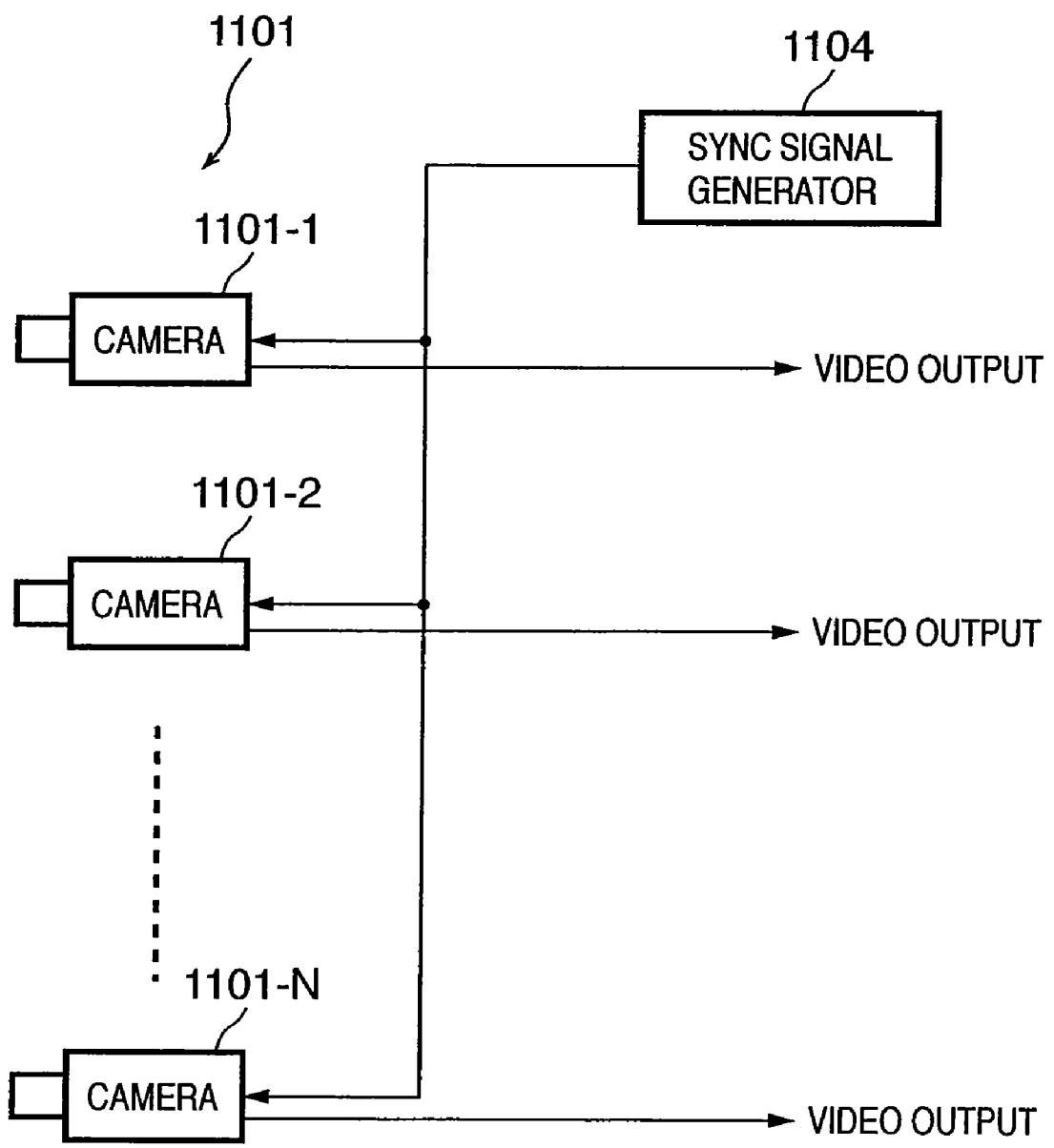
FIG. 6 is a block diagram showing the arrangement of an image sensing unit 1101 in detail.

Note that the image sensing unit 1101 comprises N (N≧2) cameras 1101-1 to 1101-N and a sync signal generator 1104, as shown in FIG. 6. The cameras 1101-1 to 1101-N can receive an external sync signal from the sync signal generator 1104. In this embodiment, the shutter timings of the cameras 1101-1 to 1101-N are matched using the external sync signal output from the sync signal generator 1104. The cameras 1101-1 to 1101-N can be laid out in a radial pattern, as shown in, by way of example, FIG. 8. Also, the viewpoint positions of the cameras 1101-1 to 1101-N may be matched by reflecting their fields of view by a polygonal mirror. In either case, the cameras 1101-1 to 1101-N are firmly fixed in position, so as not to change their relative positions and postures.

Figure 7:
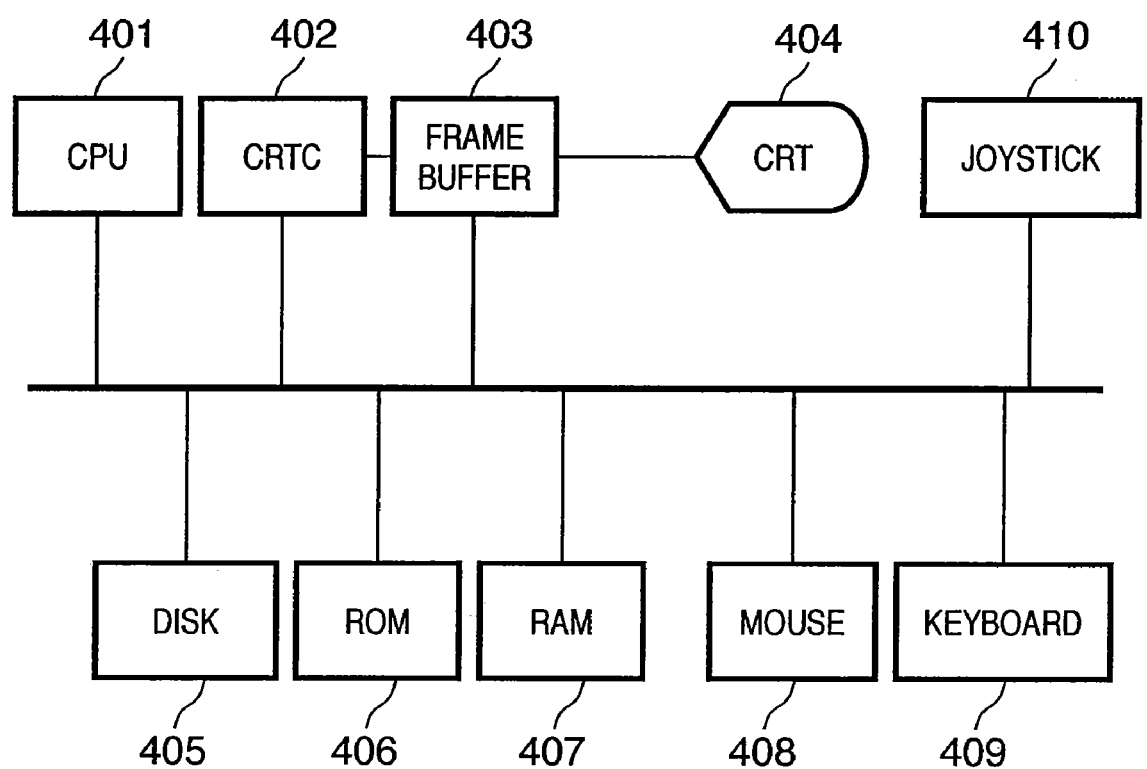
FIG. 7 is a block diagram showing an example of the hardware arrangement of an image processing apparatus 1.

The image processing apparatus 1 will be described below. FIG. 7 is a block diagram showing an example of the hardware arrangement of the image processing apparatus 1 according to this embodiment. The hardware arrangement shown in FIG. 7 is equivalent to that of a commercially available, normal personal computer. Referring to FIG. 7, a disk 405 which is represented by, but not limited to, a hard disk, which forms the sensed video storage unit 10, and stores video data obtained by the video collection system 110 explained using FIGS. 5 and 6. Note that the disk 405 forms not only the aforementioned sensed video storage unit 10, but also the individual camera posture information 50, virtual panoramic camera posture information storage unit 70, and panoramic video storage unit 90 shown in FIG. 4.

A CPU 401 serves as the individual camera posture information calculation unit 20, virtual panoramic camera posture information calculation unit 60, and panoramic video composition unit 80 when it executes a program saved in the disk 405, a ROM 406, or an external storage device (not shown).

When the CPU 401 issues various display instructions to a display controller (CRTC) 402, the display controller 402 and a frame buffer 403 make a desired display on a display (CRT) 404. Note that FIG. 7 shows the CRTC as the display controller 402, and the CRT as the display 404. The display, however, is not limited to the CRT, and a liquid crystal display or the like may be used. Note that the CRTC 402, frame buffer 403, and CRT 404 form the display unit 40 shown in FIG. 4. A mouse 408, keyboard 409, and joystick 410 allow the user to make operation inputs to the image processing apparatus 1, and form the console 30 shown in FIG. 4.

Figure 8:
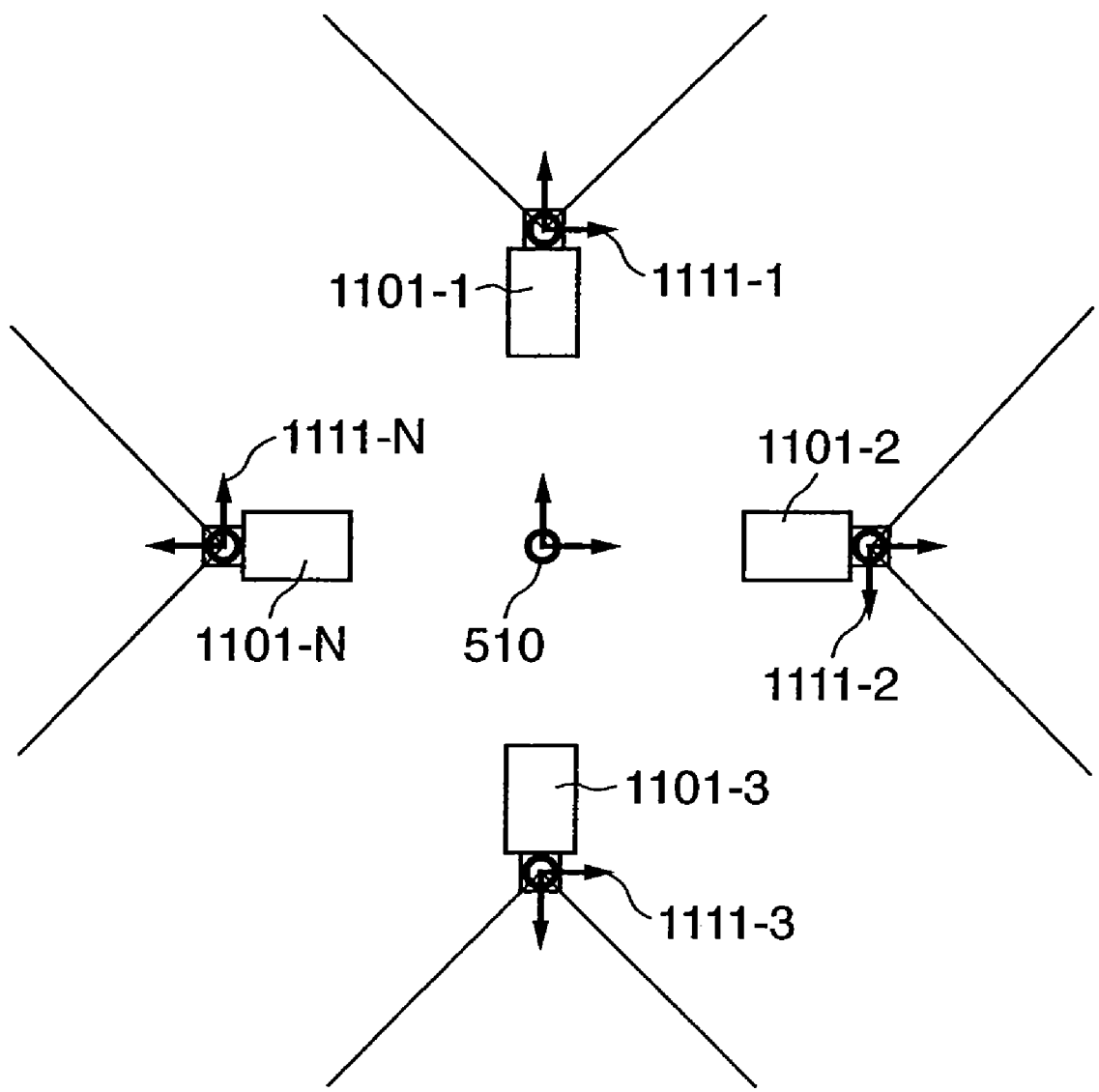
FIG. 8 is a view showing an example of a radial layout of cameras used to sense a panoramic video.

Details of the process in the image processing apparatus 1 will be described below. FIG. 8 shows an example of the radial layout of the N cameras so as to explain this method.

The relative postures of the N cameras 1101-1 to 1101-N are obtained in advance by, e.g., camera calibration or the like. Then, a virtual panoramic camera coordinate system 510 which has as an origin the barycentric position of the lens centers of the respective cameras is defined to calculate transforms between coordinate systems 1111-1 to 1111-N which have as their origins the lens centers of the respective cameras, and the virtual panoramic camera coordinate system 510. The transform between the coordinate systems can be expressed by, e.g., a 4×4 matrix.

Figure 9:
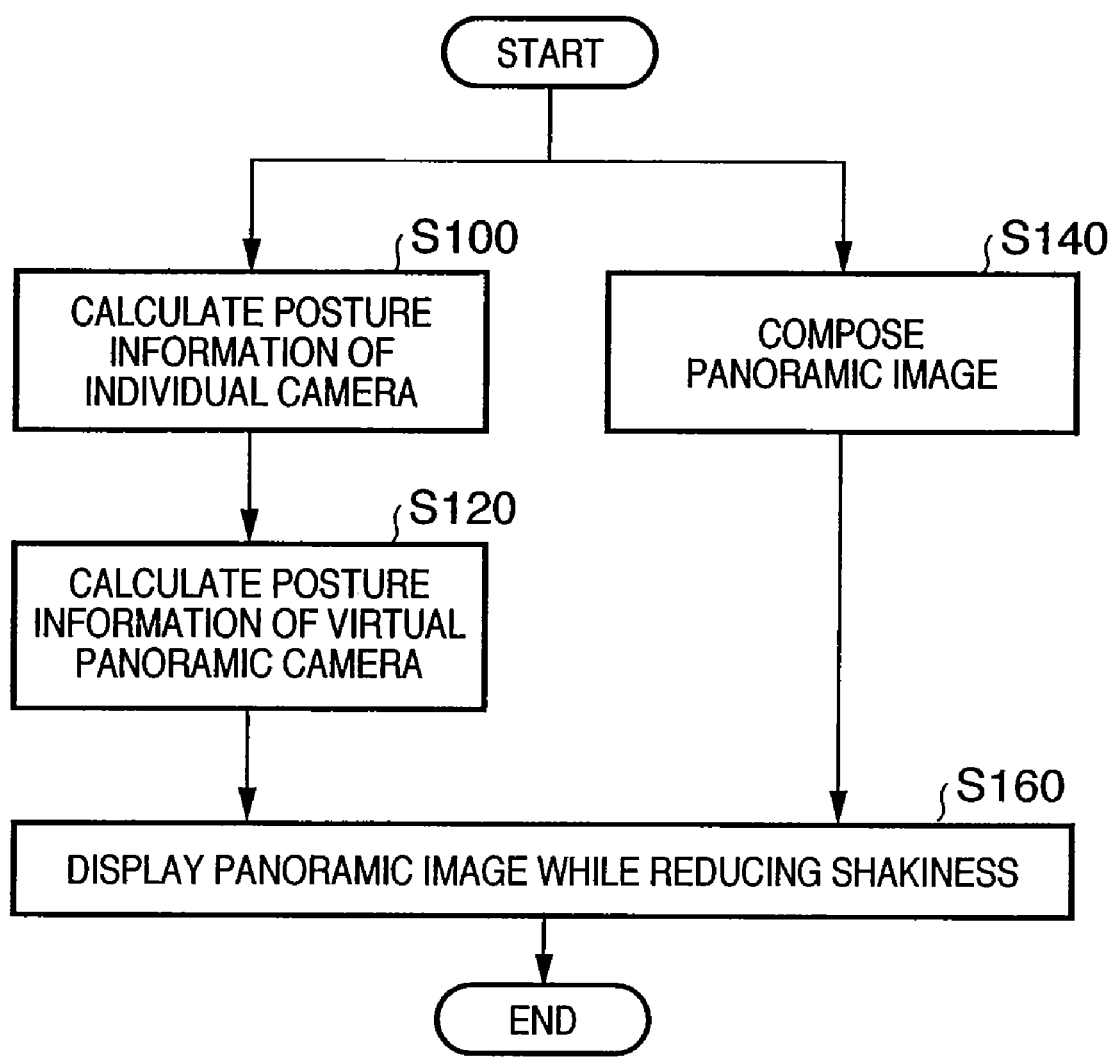
FIG. 9 is a flow chart for explaining a process for reducing shakiness upon displaying a panoramic video.

The flow of the process for reducing shakiness on the basis of a video synchronously sensed by the aforementioned cameras upon displaying a panoramic video will be explained below using the flow chart of that process shown in FIG. 9.

In step S100, posture information of each of the cameras 1101-1 to 1101-N is individually calculated. Details of this process will be explained later using the flow chart of that process shown in FIG. 10.

In step S120, the posture information of the virtual panoramic camera is calculated based on those of the respective cameras 1101-1 to 1101-N. Details of this process will be explained later using the flow chart of that process shown in FIG. 11.

In step S140, a panoramic video is composed by joining video frames obtained by the cameras 1101-1 to 1101-N. Details of this process will be explained later using the flow chart of that process shown in FIG. 12.

Finally, in step S160 a transform for reducing shakiness of the virtual panoramic camera is applied to each frame of the panoramic video composed in step S140 on the basis of the posture information of the virtual panoramic camera calculated in step S120, thus displaying a stabilized (shakiness-reduced) panoramic video on the display device. Details of this process will be explained later using the flow chart of that process shown in FIG. 13. With the above processes, shakiness can be reduced upon displaying a panoramic video.

(Calculation of Posture Information of Individual Camera)

Figure 10:
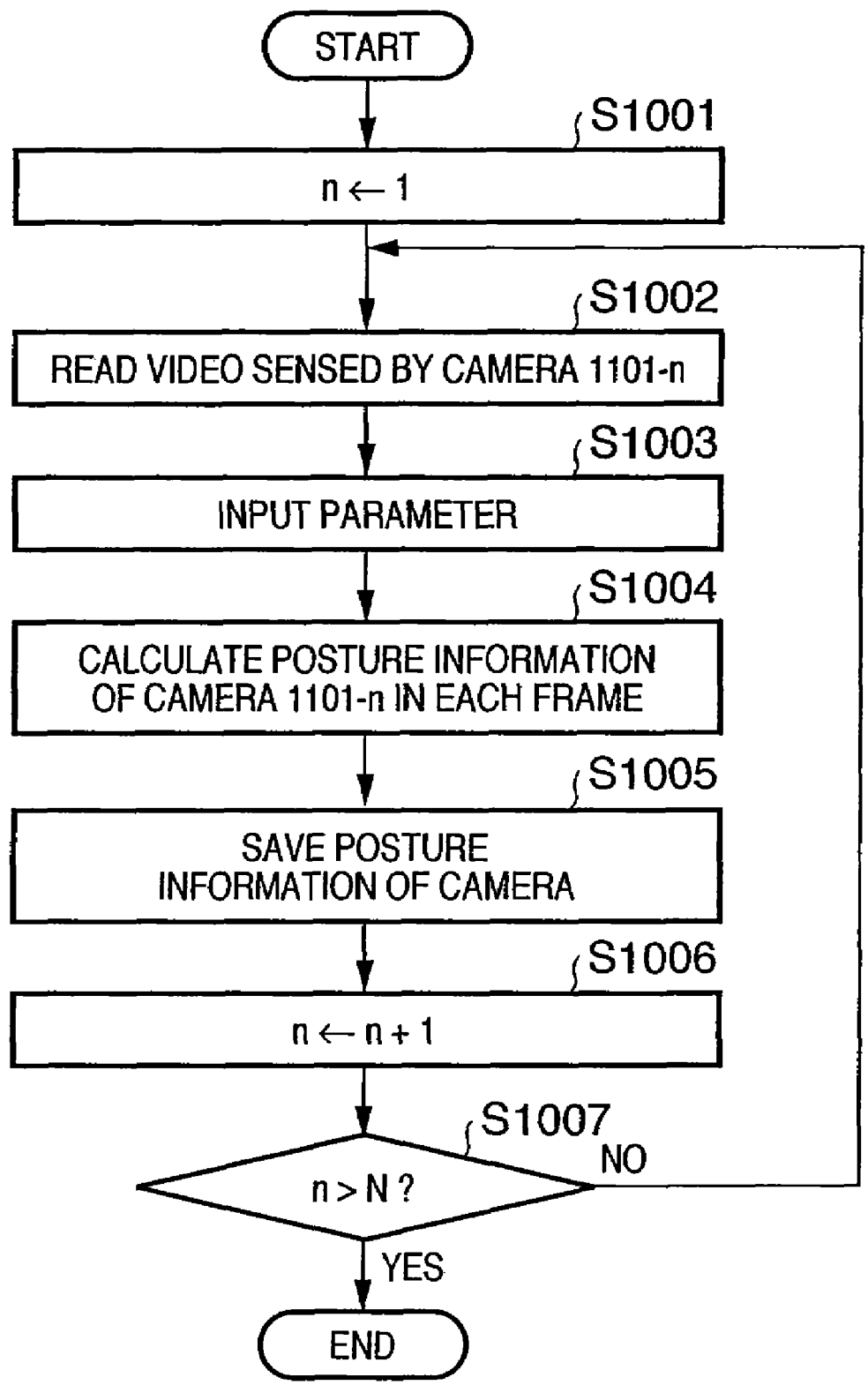
FIG. 10 is a flow chart for explaining a process in an individual camera posture information calculation unit 20.

Details of the process in step S100 in FIG. 9 will be described below using the flow chart of that process shown in FIG. 10. This is also a detailed description of the process in the individual camera posture information calculation unit 20.

In step S1001, variable n indicating the camera number is set to be an initial value "1".

In step S1002, a video sensed by the camera 1101-n is acquired by the sensed video storage unit 10. When the image sensing unit 1101 adopts an arrangement for sensing a vertically elongated video by rolling the camera 1101-n about 90° about the optical axis, the roll angle is adjusted by rolling the acquired video about 90°. On the other hand, when the image sensing unit 1101 adopts an arrangement for reflecting the field of view of the camera 1101-n by a polygonal mirror, the influence of the mirror is removed by, e.g., inverting the acquired video.

In step S1003, known camera parameters (e.g., the image sensing element size, focal length, and the like) of the camera 1101-n are input.

In step S1004, posture information of the camera 1101-n in each frame is calculated. More specifically, a transform $H_{nm}$ from the coordinate system in each frame m (m=2 to M) to that in frame 1 is calculated using match moving software or the like. Note that M represents the total number of frames of the video sensed by the camera 1101-n. Also, since the posture information can be easily calculated from the transform $H_{nm}$, the transform $H_{nm}$ represents the posture information in this embodiment.

In step S1005, the posture information $H_{nm}$ of the camera in each frame is stored in the camera posture information storage unit 50.

In step S1006, n indicating the camera number is incremented by "1". It is checked in step S1007 if the processes for all the cameras are complete. If NO in step S1007, the flow returns to step S1002.

With the above processes, the posture information of each camera in each frame can be individually calculated.

(Calculation of Posture Information of Virtual Panoramic Camera)

Details of the process in step S120 will be explained below using the flow chart of that process shown in FIG. 11. This is also a detailed description of the process in the virtual panoramic camera posture information calculation unit 60.

In step S1201, the posture information $H_{nm}$ of each camera in each frame is acquired from the camera posture information storage unit 50.

In step S1202, m indicating the frame number is set to be an initial value "1". In step S1203, n indicating the camera number is set to be an initial value "1".

Figure 1:
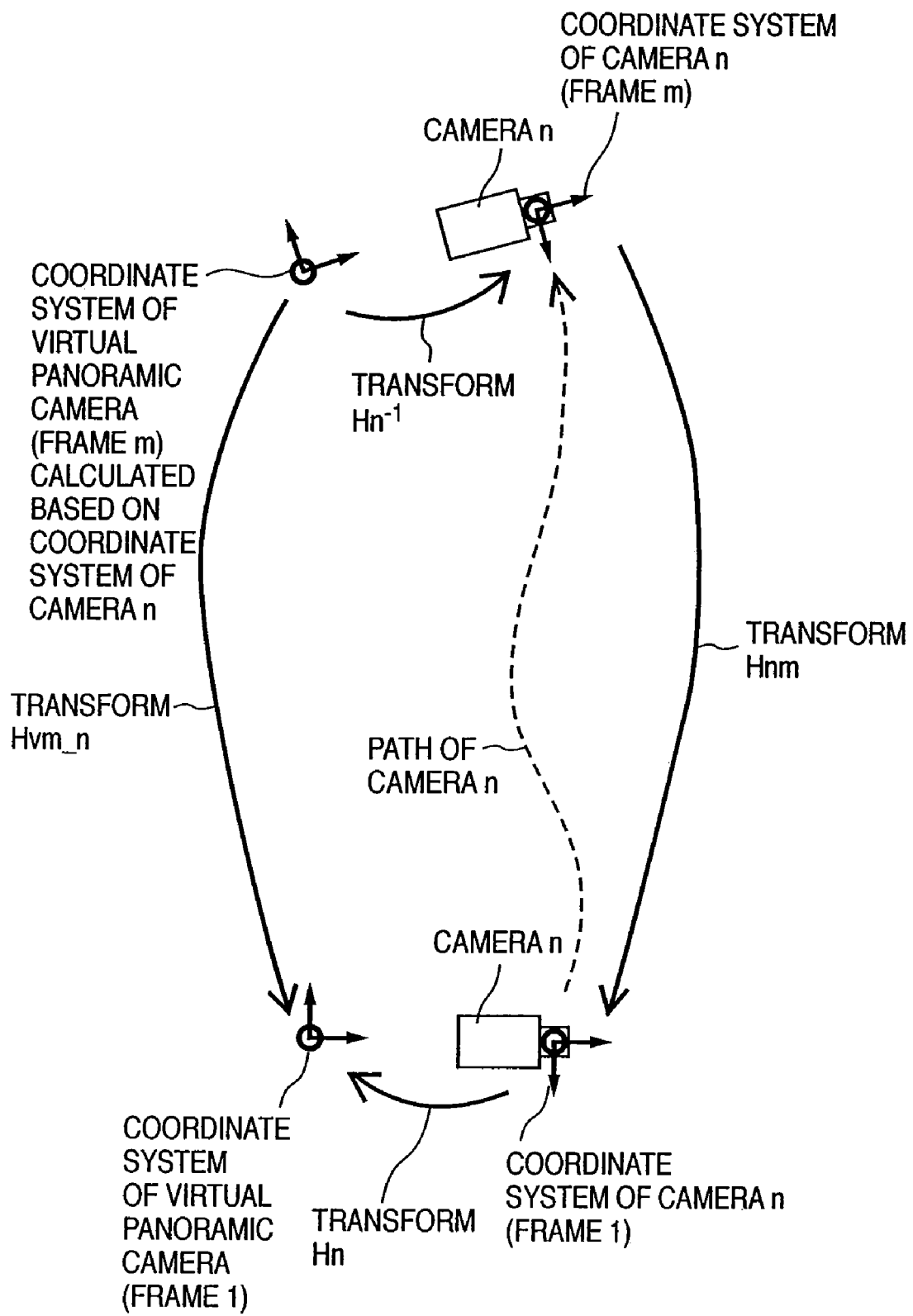
FIG. 1 is a view for explaining transformation for estimating the position and posture of the virtual panoramic camera for each camera.

In step S1204, the posture information of the virtual panoramic camera is calculated for each camera. That is, as shown in FIG. 1, a transform $H_{vm\_n}$ from the coordinate system of the virtual panoramic camera in frame m to that in frame 1 is calculated based on $H_{nm}$. Assume that the transform $H_{vm\_n}$ represents the posture information of the virtual panoramic camera.

More specifically, $H_{vm\_n}$ is given by:

$$H_{vm\_n} = H_n \cdot H_{nm} \cdot H_n^{-1}$$

where $H_n$ represents a transform from the coordinate system of the camera 1101-n to that of the virtual panoramic camera. When the respective cameras are fixed in position, and their relative postures do not change, since $H_n$ does not change, $H_n$ can be calculated in advance.

In step S1205, posture information $H_{vm\_n}$ of the virtual panoramic camera in each frame is stored in the virtual panoramic camera posture information storage unit 70.

In step S1206, n indicating the camera number is incremented by "1". It is checked in step S1207 if the processes for all camera images are complete. If NO in step S1207, the flow returns to step S1204.

Figure 2:
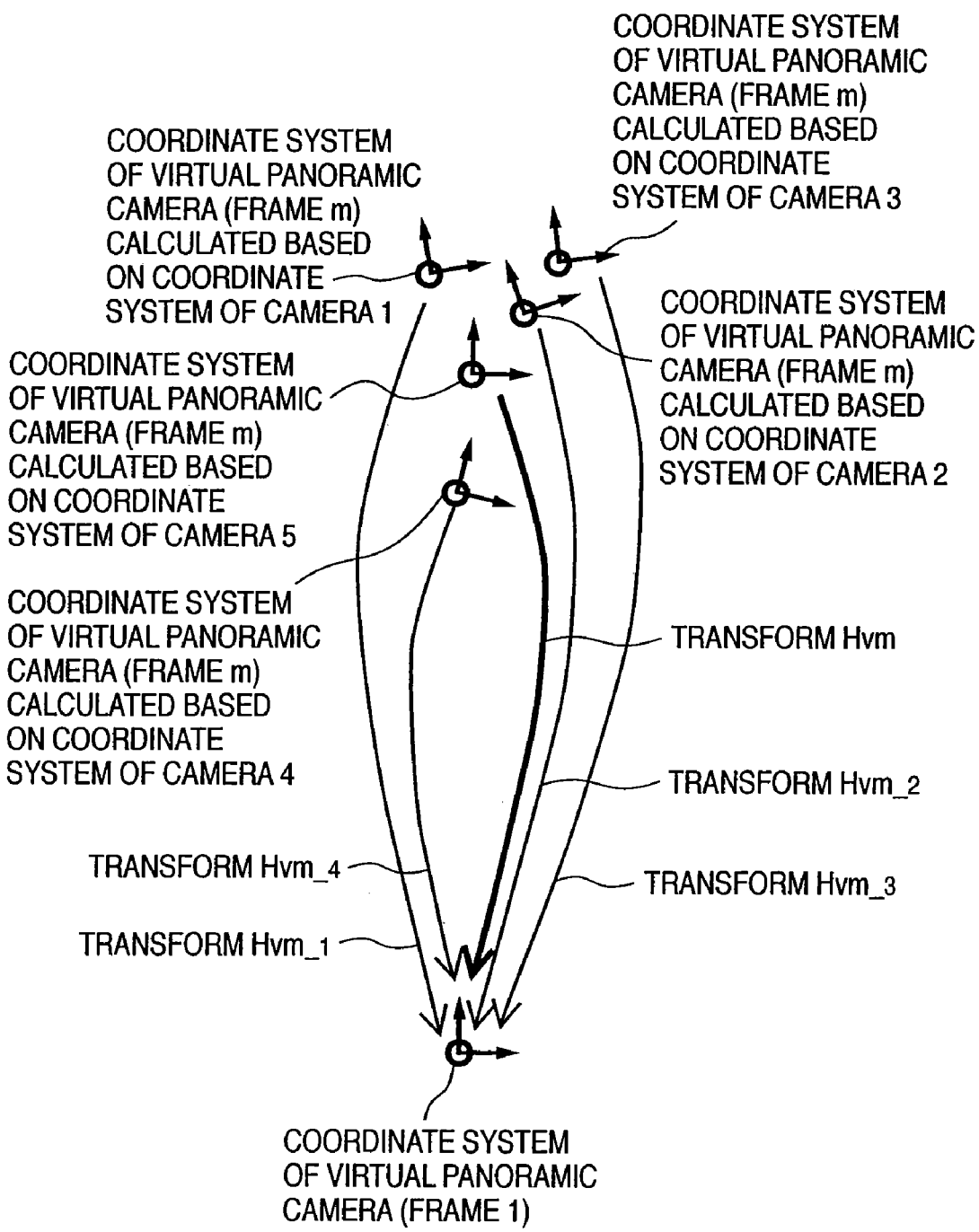
FIG. 2 is a view for explaining transformation for estimating the position and posture of the virtual panoramic camera using the estimated values of the positions and postures of the virtual panoramic camera calculated for each camera.

In step S1208, respective pieces of posture information of the virtual panoramic camera are combined. More specifically, the posture information of the virtual panoramic camera is calculated based on those of the virtual panoramic camera, which are calculated in correspondence with the number of cameras in step S1204. That is, as shown in FIG. 2, a transform $H_{vm}$ from the coordinate system of the virtual panoramic camera in frame m to that in frame 1 of this camera is estimated based on $H_{vm\_n}$ calculated for the cameras 1101-1 to 1101-N.

More specifically, the transforms $H_{vm\_n}$ calculated for cameras 1101-1 to 1101-N are transformed into vectors $x_{vm\_n} = (\theta_{vm\_n}, \phi_{vm\_n}, \varphi_{vm\_n})$, and a vector $x_{vm} = (\theta_{vm}, \phi_{vm}, \varphi_{vm})$ is calculated from these N vectors. Then, that vector is transformed into a 4×4 rotation matrix $H_{vm}$. Note that $\theta_{vm}$ is the roll angle, $\phi_{vm}$ is the pitch angle, and $\varphi_{vm}$ is the yaw angle.

For example, on a left-hand coordinate system, if respective elements of the transform $H_{vm\_n}$ are expressed by:

$$H_{vm\_n} = \begin{pmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & 1 \end{pmatrix}$$

formulas for calculating $\theta_{vm\_n}$, $\phi_{vm\_n}$, and $\varphi_{vm\_n}$ from the transform $H_{vm\_n}$ are:

$$\theta_{vm\_n} = \tan^{-1}\left(\frac{r_{21}}{r_{22}}\right)$$

$$\phi_{vm\_n} = \tan^{-1}\left(-\frac{r_{23}}{\sqrt{r_{21}^2 + r_{22}^2}}\right)$$

$$\varphi_{vm\_n} = \tan^{-1}\left(\frac{r_{13}}{r_{33}}\right)$$

Also, the 4×4 rotation matrix $H_{vm}$ is given by:

$$H_{vm} = \begin{pmatrix} \cos\varphi_{vm} & 0 & \sin\varphi_{vm} & 0 \\ 0 & 1 & 0 & 0 \\ -\sin\varphi_{vm} & 0 & \cos\varphi_{vm} & 0 \\ 0 & 0 & 0 & 1 \end{pmatrix} \begin{pmatrix} 1 & 0 & 0 & 0 \\ 0 & \cos\phi_{vm} & -\sin\phi_{vm} & 0 \\ 0 & \sin\phi_{vm} & \cos\phi_{vm} & 0 \\ 0 & 0 & 0 & 1 \end{pmatrix}$$

$$\begin{pmatrix} \cos\theta_{vm} & -\sin\theta_{vm} & 0 & 0 \\ \sin\theta_{vm} & \cos\theta_{vm} & 0 & 0 \\ 0 & 0 & 1 & 0 \\ 0 & 0 & 0 & 1 \end{pmatrix}$$

$$= \begin{pmatrix} \cos\varphi_{vm}\cos\theta_{vm} + \sin\varphi_{vm}\sin\phi_{vm}\sin\theta_{vm} & -\cos\varphi_{vm}\sin\theta_{vm} + \sin\varphi_{vm}\sin\phi_{vm}\cos\theta_{vm} & \sin\varphi_{vm}\cos\phi_{vm} & 0 \\ \cos\phi_{vm}\sin\theta_{vm} & \cos\phi_{vm}\cos\theta_{vm} & 0 & 0 \\ -\sin\varphi_{vm}\cos\theta_{vm} + \cos\varphi_{vm}\sin\phi_{vm}\sin\theta_{vm} & \sin\varphi_{vm}\sin\theta_{vm} + \cos\varphi_{vm}\sin\phi_{vm}\cos\theta_{vm} & \cos\varphi_{vm}\cos\phi_{vm} & 0 \\ 0 & 0 & 0 & 1 \end{pmatrix}$$

where $x_{vm}$ can be, e.g., the average of $x_{vm\_1}$ to $x_{vm\_N}$. In this case, $x_{vm}$ is given by:

$$x_{vm} = \frac{\sum_{n=1}^{N} x_{vm\_n}}{N}$$

On the other hand, in place of simply calculating the average of the values $x_{vm\_1}$ to $x_{vm\_N}$, $x_{vm}$ may be calculated in accordance with required reliability, thus further reducing an error of $x_{vm}$.

Some examples will be explained below.

The values $x_{vm\_n}$ (n=1 to N) can be obtained by detecting feature points in an image, tracing these points across a plurality of frames, and making geometric calculations such as factorization or the like based on a set of the traced feature points. In this case, the reliability of the value $x_{vm\_n}$ depends on how many frames in average the feature points can be traced. That is, reliability $r_n$ of $x_{vm\_n}$ can be expressed by:

$$r_n = f(m_n)$$

where $m_n$ is the average number of traceable frames, and f is an arbitrary function.

In case of a simple proportionality relation, the reliability $r_n$ is given by:

$$r_n = M_n$$

At this time, assuming that an error is not allowed if the average number of traceable frames is less than a given threshold value (e.g., 10), when $$r_n < 10$$

$x_{vm\_n}$ is inhibited from being used in calculations of $x_{vm}$, thus reducing an error of $x_{vm}$.

Alternatively, $x_{vm}$ can be estimated more accurately when it is calculated as the weighted average according to the reliabilities of $x_{vm\_1}$ to $x_{vm\_N}$. In this case, $x_{vm}$ is given by:

$$x_{vm} = \frac{\sum_{n=1}^{N} r_n x_{vm\_n}}{\sum_{n=1}^{N} r_n}$$

The reliability $r_n$ of $x_{vm\_m}$ can be calculated in advance in accordance with the direction of each camera, which forms the video collection system 110, in place of being calculated based on the average number $m_n$ of traceable frames. If an angle the travel direction of the video collection system 110 and the optical axis direction of each camera make is approximate to 90°, since the moving amounts of feature points on a frame become large, the average number of traceable frames tends to decrease. Hence, the reliability $r_n$ can be set to be a smaller value in advance with increasing angle the travel direction or reverse travel direction and the optical axis direction of each camera make.

For example, let $v_s$ be the vector of the travel direction, and $v_c$ be the optical axis direction of the camera. Then, using their inner product, the reliability $r_n$ can be expressed by:

$$r_n = |v_s * v_c| + r_{n0}$$

where $r_{n0}$ is an arbitrary constant.

Note that the reliabilities corresponding to the respective cameras can be set to be symmetrical about the center of the video collection system 110. When an automobile that mounts the video collection system 110 travels along the left-hand lane, since cameras on the left side in the travel direction have smaller distances to an object than those on the right side, the average number of frames that can be used to trace feature points becomes smaller. Hence, the reliabilities of the cameras on the left side in the travel direction may be set to be lower than those on the right side.

Also, a calculation of the value $x_{vm\_n}$ corresponding to a camera which makes nearly a right angle with the travel direction may be skipped. As a result, an error of $x_{vm}$ can be reduced while shortening the calculation time.

Note that the process for calculating the weighted average of $x_{vm\_1}$ to $x_{vm\_N}$ can calculate a simple average or can inhibit some values from being used in calculations depending on the method of setting the reliability $r_n$ used as the weight. That is, if an identical $r_n$ is set for all "n"s, a simple average is calculated; if $r_n$ is set to be zero for a given n, the corresponding value $x_{vm\_n}$ is not used.

Figure 11:
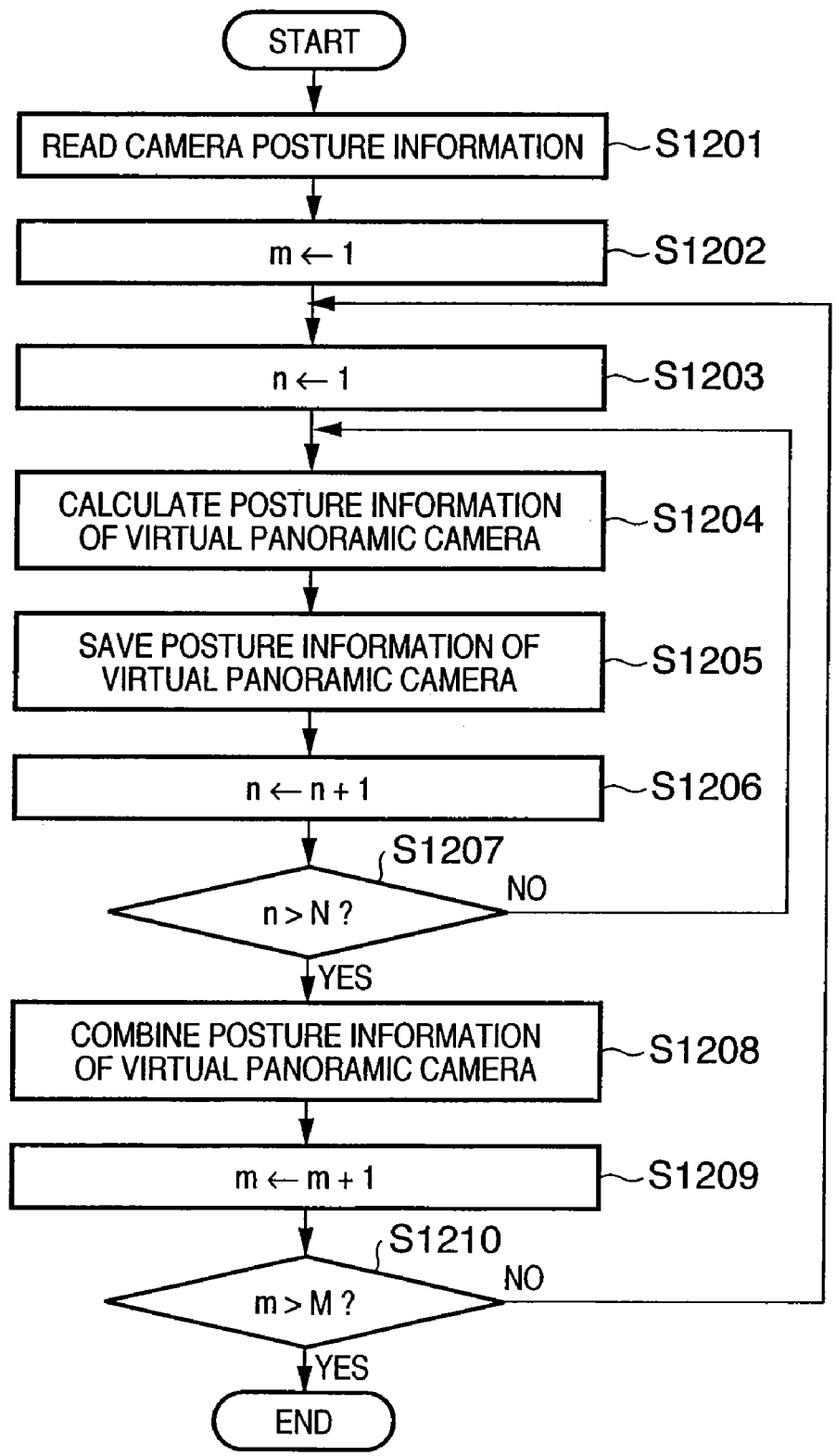
FIG. 11 is a flow chart for explaining a process in a virtual panoramic camera posture information calculation unit 60.

The description will revert to the flow chart shown in FIG. 11. In step S1209, m indicating the frame number is incremented by "1". It is checked in step S1210 if the processes for all frames are complete. If NO in step S1210, the flow returns to step S1203.

With the above processes, posture information of the virtual panoramic camera in each frame can be obtained.

(Generation of Panoramic Video)

Figure 12:
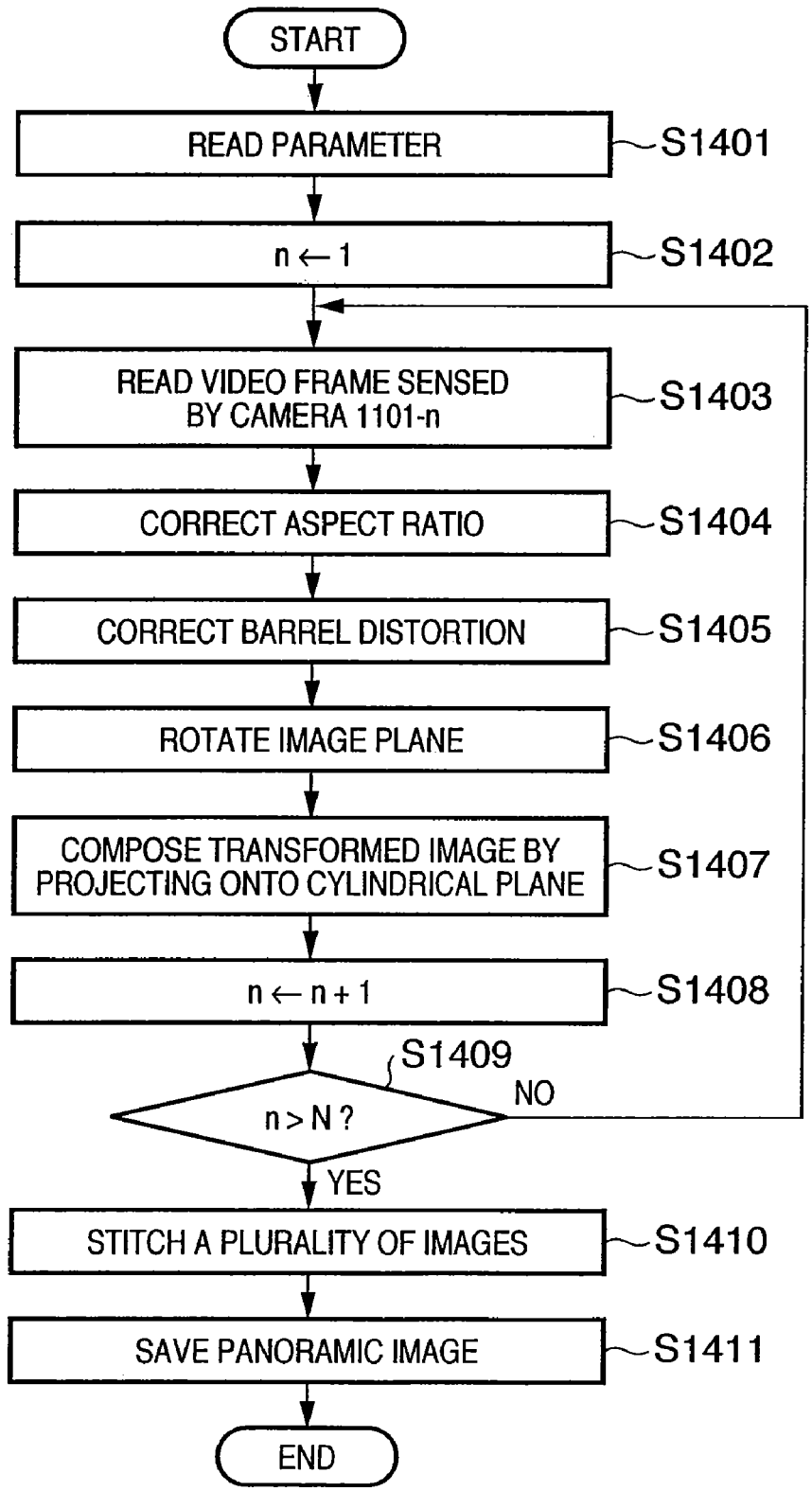
FIG. 12 is a flow chart for explaining a process in a panoramic video composition unit 80.

Details of the panoramic video generation process in step S140 in FIG. 9 will be described below using the flow chart of that process shown in FIG. 12. This is also a detailed description of the process in the panoramic video composition unit 80. A panoramic video is composed by sequentially executing the following processes for a plurality of successive frames.

In step S1401, various parameters used in image correction and panoramic image generation are read from a parameter storage unit (not shown). In. step S1402, n indicating the camera number is set to be an initial value "1".

In step S1403, a video frame sensed by the camera 1101-n is acquired from the sensed video storage unit 10. As described above, when the image sensing unit 1101 adopts an arrangement for sensing a vertically elongated video by rolling the camera 1101-n about 90° about the optical axis, the roll angle is adjusted by rolling the acquired video about 90°. On the other hand, when the image sensing unit 1101 adopts an arrangement for reflecting the field of view of the camera 1101-n by a polygonal mirror, the acquired video is inverted.

In step S1404, the aspect ratio of the read image is corrected. In step S1405, lens distortion is corrected. In this embodiment, barrel distortion is corrected. In step S1406, an image plane is rotated. In step S1407, the image is projected from a plane to a cylindrical surface in accordance with the field angle read from the parameter storage unit (not shown), thus composing a transformed image.

In step S1408, n indicating the camera number is incremented by "1". It is checked in step S1409 if the processes for all the camera images are complete. If NO in step S1409, the flow returns to step S1403.

Finally, in step S1410 N (equal to the number of cameras) transformed images are joined using upper, lower, right, and left shift amounts, a mixing ratio, and the like read from the parameter storage unit (not shown). In step S1411, the composed panoramic image is stored in the panoramic video storage unit 90.

Applying the above processes sequentially to consecutive images, a panoramic video can be composed on the basis of various parameters.

(Display of a Stabilized Panoramic Video)

Details of the process in step S160 in FIG. 9 will be explained below using the flow chart of that process shown in FIG. 13. This is also a detailed description of the process in the stabilize unit 100.

In step S1601, the posture information $H_{vm}$ of the virtual panoramic camera in each frame is acquired from the virtual panoramic camera posture information storage unit 70.

In step S1602, m indicating the frame number is set in accordance with the operation at the console 30. In step S1603, frame m of the panoramic video is acquired from the panoramic video storage unit 90.

In step S1604, a transform for reducing shakiness of the virtual panoramic camera is applied to the acquired panoramic image, and a stabilized panoramic image is displayed on the display unit 40.

Note that a transform $H_{vm\_s}$ for reducing shakiness of the virtual panoramic camera can be calculated from $H_{vm}$ acquired in step S1601. For example, $H_{vm\_s}$ can be a 4×4 rotation matrix that expresses a posture vector $x_{vm}=(-\theta_{vm}, -\phi_{vm}, -\phi_{vm})$ which is formed based on the roll angle θ, pitch angle φ, and yaw angle φ obtained from $H_{vm}$. Upon application of such transform, the posture of the virtual panoramic camera in frame m can be set to be substantially equal to that in frame 1. Note that the yaw angle need not be corrected by setting $x_{vm}=(-\theta_{vm}, -\phi_{vm}, 0)$. In this way, when the image collection system 110 is moving while turning, that turn motion can be prevented from being removed by the shakiness reduction process.

It is finally checked in step S1605 if the display process is to end. If NO in step S1605, the processes are repeated from step S1602.

With the above processes, a stabilized panoramic video can be displayed.

As described above, according to the first embodiment, shakiness can be reduced using the posture information of the virtual panoramic camera, which is calculated based on those of a plurality of cameras, upon displaying a panoramic video.

Second Embodiment

In the first embodiment, the posture information is formed of three kinds of azimuth information: the roll angle, pitch angle, and yaw angle. This embodiment will explain a case wherein the posture information includes three-dimensional position information in addition to these three kinds of azimuth information.

The flow of the process in the virtual panoramic camera posture information calculation unit 60 in this embodiment is substantially the same as that in the flow chart of the first embodiment shown in FIG. 11, except for a combining method of posture information of the virtual panoramic camera in step S1208.

In this embodiment, the transforms $H_{vm\_n}$ calculated for the cameras 1101-1 to 1101-N are transformed into vectors $x_{vm\_n}=(X_{vm\_n}, Y_{vm\_n}, Z_{vm\_n}, \theta_{vm\_n}, \phi_{vm\_n}, \varphi_{vm\_n})$, and a vector $x_{vm}=(X_{vm}, Y_{vm}, Z_{vm}, \theta_{vm}, \phi_{vm}, \varphi_{vm})$ is calculated from these N vectors. Then, that vector is transformed into a 4×4 matrix $H_{vm}$.

For example, on a left-hand coordinate system, if respective elements of the transform $H_{vm\_n}$ are expressed by:

$$H_{vm\_n} = \begin{pmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & 1 \end{pmatrix}$$

formulas for calculating $X_{vm}, Y_{vm}, Z_{vm}, \theta_{vm}, \phi_{vm\_n}$, and $\varphi_{vm\_n}$ from the transform $H_{vm\_n}$ are:

$$X_{vm\_n} = r_{14}$$

$$Y_{vm\_n} = r_{24}$$

$$Z_{vm\_n} = r_{34}$$

$$\theta_{vm\_n} = \tan^{-1}\left(\frac{r_{21}}{r_{22}}\right)$$

$$\phi_{vm\_n} = \tan^{-1}\left(-\frac{r_{23}}{\sqrt{r_{21}^2 + r_{22}^2}}\right)$$

$$\varphi_{vm\_n} = \tan^{-1}\left(\frac{r_{13}}{r_{33}}\right)$$

Also, the matrix $H_{vm}$ is given by:

$$H_{vm} = \begin{pmatrix} \cos\varphi_{vm}\cos\theta_{vm} + & -\cos\varphi_{vm}\sin\theta_{vm} + & & \\ \sin\varphi_{vm}\sin\phi_{vm}\sin\theta_{vm} & \sin\varphi_{vm}\sin\phi_{vm}\cos\theta_{vm} & \sin\varphi_{vm}\cos\phi_{vm} & X_{vm} \\ \cos\phi_{vm}\sin\theta_{vm} & \cos\phi_{vm}\cos\theta_{vm} & 0 & Y_{vm} \\ -\sin\varphi_{vm}\cos\theta_{vm} + & \sin\varphi_{vm}\sin\theta_{vm} + & & \\ \cos\varphi_{vm}\sin\phi_{vm}\sin\theta_{vm} & \cos\varphi_{vm}\sin\phi_{vm}\cos\theta_{vm} & \cos\varphi_{vm}\cos\phi_{vm} & Z_{vm} \\ 0 & 0 & 0 & 1 \end{pmatrix}$$

Note that the method of calculating one vector $x_{vm}$ from the N vectors is the same as that explained in the first embodiment.

Figure 13:
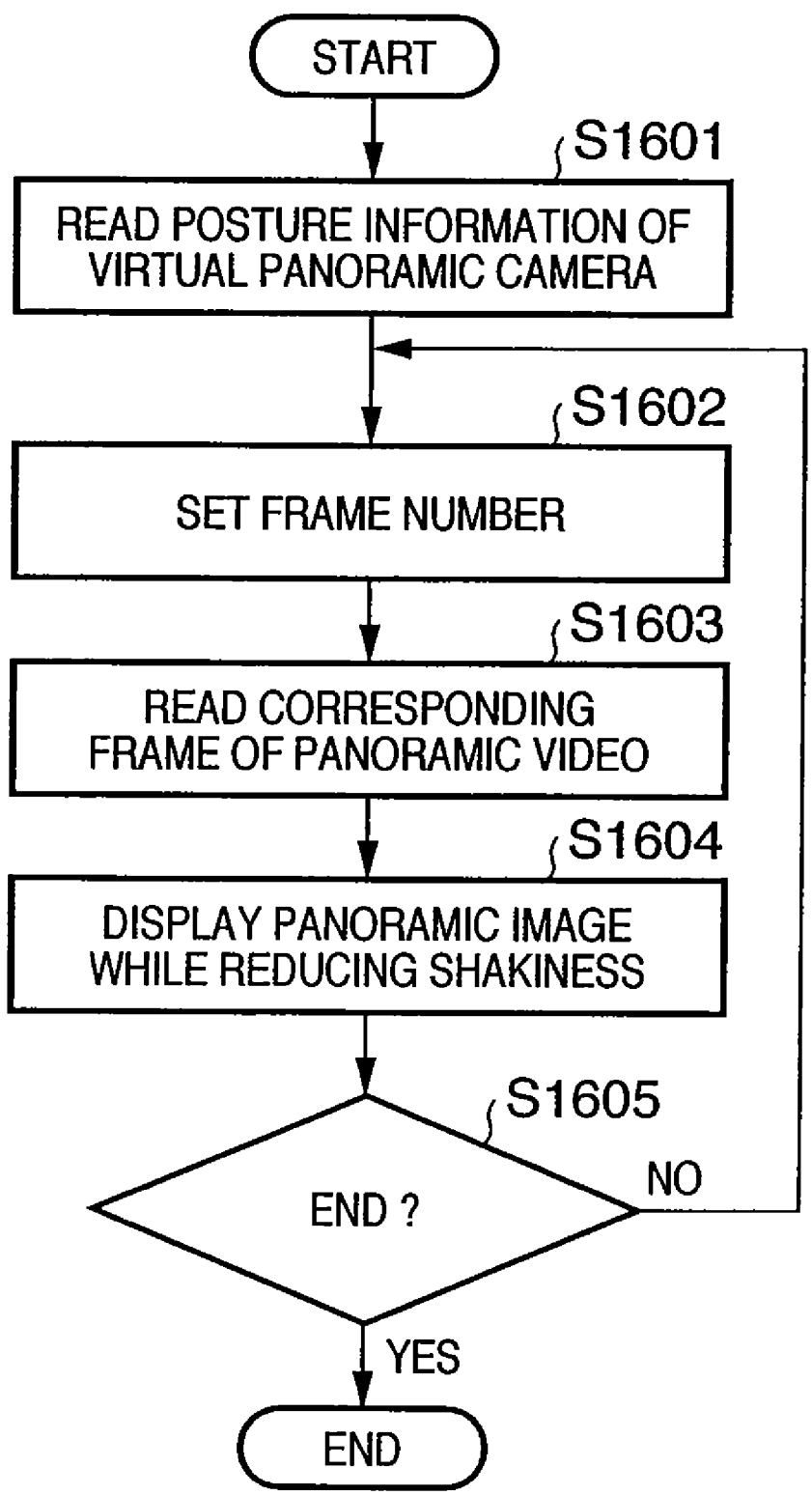
FIG. 13 is a flow chart for explaining a process in a stabilize unit 100.

Also, the flow of the process in the stabilize unit 100 in this embodiment is substantially the same as that in the flow chart in the first embodiment shown in FIG. 13, except for the calculation method of the transform $H_{vm\_s}$ for reducing shakiness of the virtual panoramic camera in step S1604.

In this embodiment, $H_{vm\_s}$ can be a 4×4 matrix that expresses a posture vector $x_{vm} = (-X_{vm}, -Y_{vm}, -Z_{vm}, -\theta_{vm}, -\phi_{vm}, -\phi_{vm})$ which is formed based on the coordinates $X_{vm}$, $Y_{vm}$, and $Z_{vm}$, the roll angle $\theta_{vm}$, pitch angle $\phi_{vm}$, and yaw angle $\phi_{vm}$ obtained from $H_{vm}$. Note that the yaw angle may not be corrected by setting $x_{vm} = (-X_{vm}, -Y_{vm}, -Z_{vm}, -\theta_{vm}, -\phi_{vm}, 0)$.

As described above, according to the second embodiment, even when three-dimensional position information is included in the posture information, shakiness can be reduced upon displaying a panoramic video.

Third Embodiment

This embodiment will explain an image processing method, which calculates the posture information of a virtual panoramic camera on the basis of those of a plurality of cameras, and reduces shakiness using the re-calculation results of the posture information of the plurality of cameras based on that of the virtual panoramic camera upon generation of a panoramic video.

Figure 14:
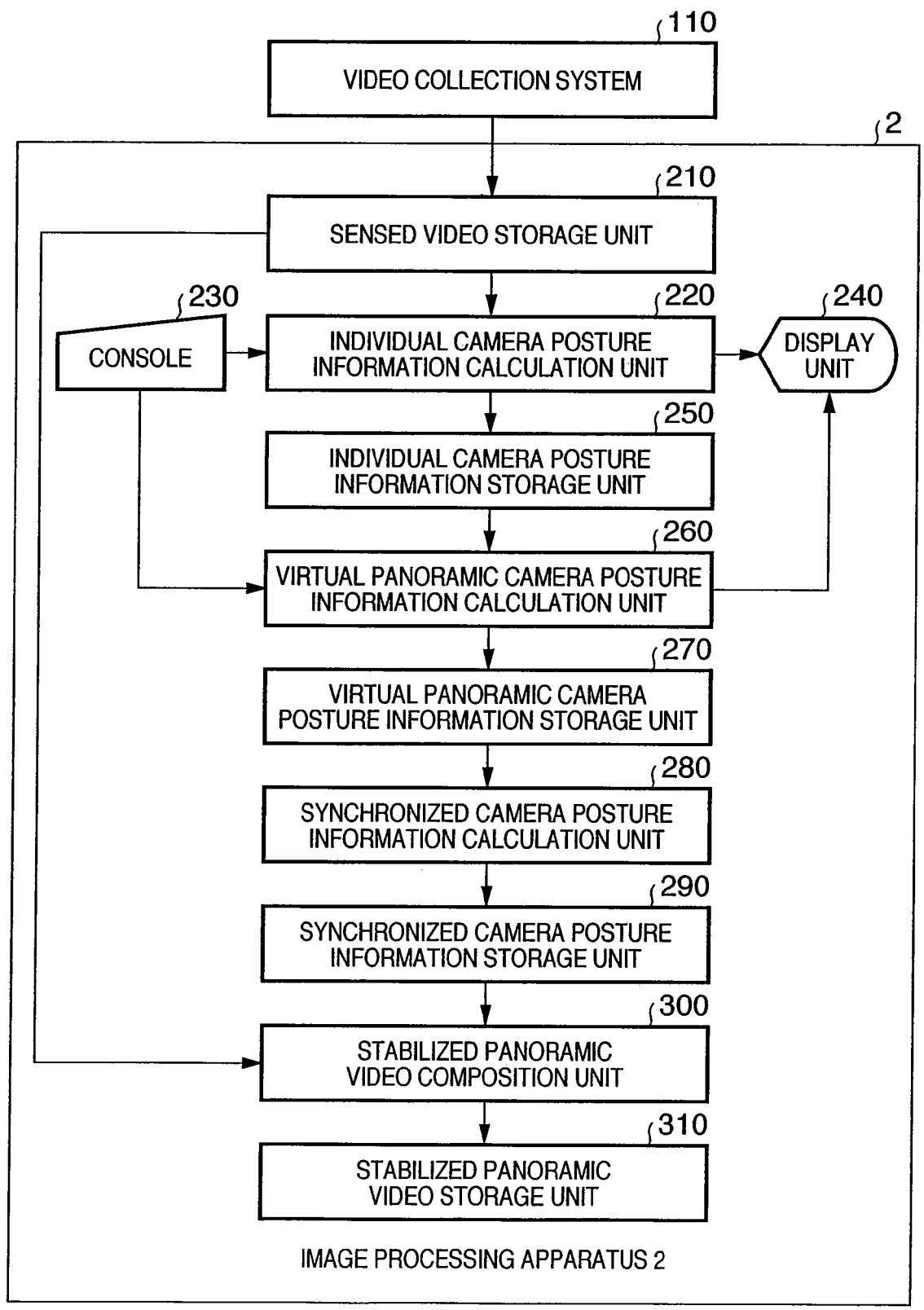
FIG. 14 is a block diagram for explaining the functional arrangement of a panoramic video generation system according to the third embodiment.

A panoramic video generation system according to this embodiment will be explained first. FIG. 14 is a block diagram for explaining the functional arrangement of the panoramic video generation system according to this embodiment. This system includes a video collection system 110 and image processing apparatus 2. The image processing apparatus 2 comprises a sensed video storage unit 210, individual camera posture information calculation unit 220, console 230, display unit 240, individual camera posture information storage unit 250, virtual panoramic camera posture information calculation unit 260, virtual panoramic camera posture information storage unit 270, synchronized camera posture information calculation unit 280, synchronized camera posture information storage unit 290, stabilized panoramic video composition unit 300, and stabilized panoramic video storage unit 310.

Note that the arrangements of the sensed video storage unit 210, individual camera posture information calculation unit 220, console 230, display unit 240, individual camera posture information storage unit 250, virtual panoramic camera posture information calculation unit 260, and virtual panoramic camera posture information storage unit 270 are the same as those of the sensed video storage unit 10, individual camera posture information calculation unit 20, console 30, display unit 40, individual camera posture information storage unit 50, virtual panoramic camera posture information calculation unit 60, and virtual panoramic camera posture information storage unit 70 in the first embodiment.

The synchronized camera posture information calculation unit 280 re-calculates the posture information of each camera on the basis of the calculation result of the virtual panoramic camera posture information calculation unit 260. Details of the process will be explained later.

The synchronized camera posture information storage unit 290 stores the posture information of each camera calculated by the aforementioned synchronized camera posture information calculation unit 280.

The stabilized panoramic video composition unit 300 executes a stabilized panoramic video generation process by joining video data saved in the sensed video storage unit 210 after shakiness reduction process. Details of the process will be explained later.

The stabilized panoramic video storage unit 310 stores a stabilized panoramic video composed by the stabilized panoramic video composition unit 300.

The image processing apparatus 2 will be explained below. The image processing apparatus 2 according to this embodiment can be implemented by the same hardware arrangement as that of the image processing apparatus 1 according to the first embodiment shown in FIG. 7. Note that some individual arrangements are different.

The disk 405 forms not only the sensed video storage unit 210, but also the individual camera posture information 250, virtual panoramic camera posture information storage unit 270, and synchronized camera posture information storage unit 290, and stabilized panoramic video storage unit 310 shown in FIG. 14.

The CPU 401 serves as the individual camera posture information calculation unit 220, virtual panoramic camera posture information calculation unit 260, synchronized camera posture information calculation unit 280, and stabilized panoramic video composition unit 300.

The CRTC 402, frame buffer 403, and CRT 404 form the aforementioned display unit 240. A mouse 408, keyboard 409, and joystick 410 allow the user to make operation inputs to the image processing apparatus 2, and form the aforementioned console 230.

Details of the process in the image processing apparatus 2 will be described below. As in the first embodiment, a case will be exemplified wherein N cameras are laid out in a radial pattern, as shown in FIG. 8.

Figure 15:
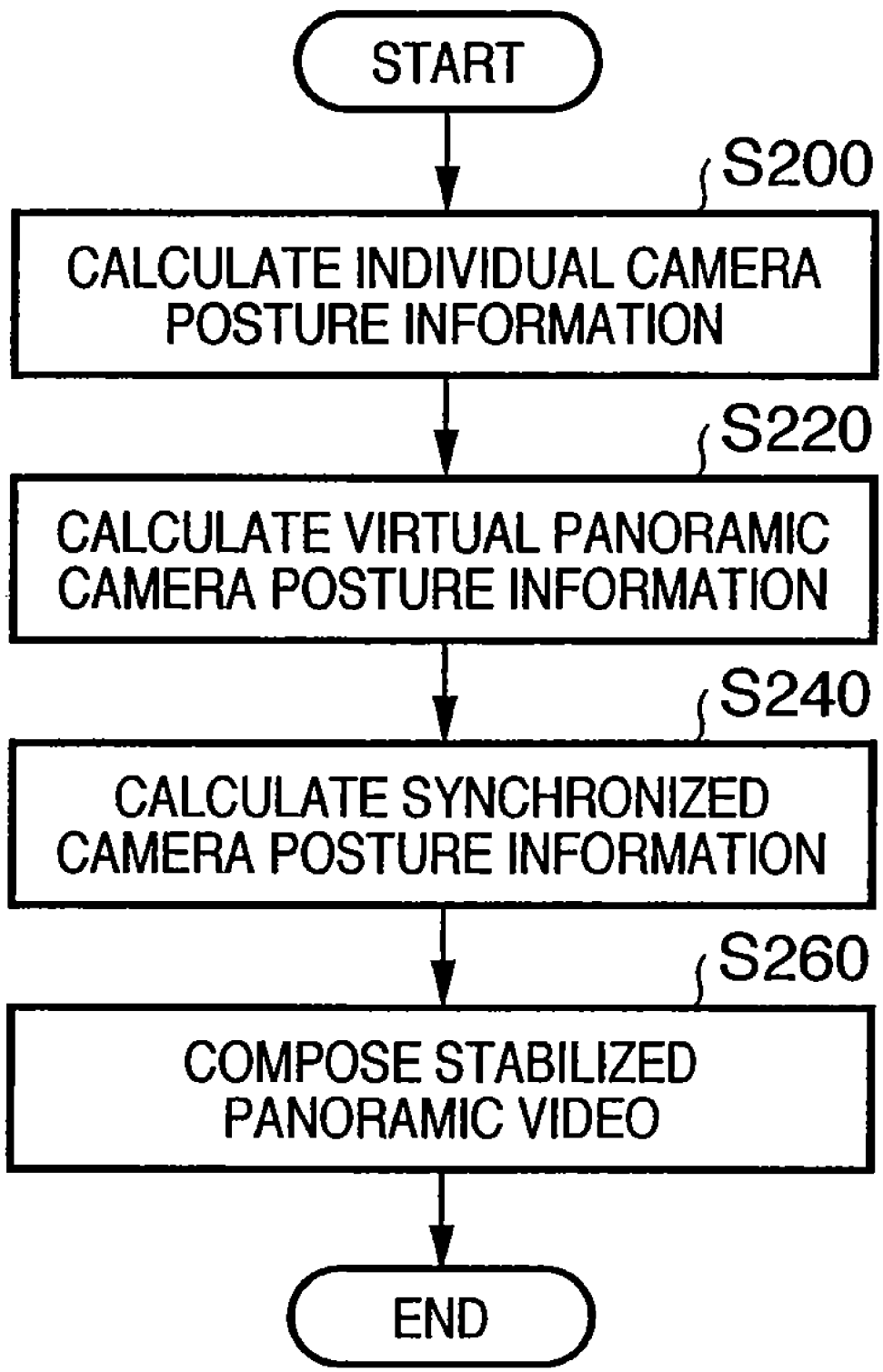
FIG. 15 is a flow chart for explaining a process for reducing shakiness upon generation of a panoramic video.

The flow of the process for reducing shakiness of a video synchronously sensed by the aforementioned cameras and then composing a panoramic video will be explained below using the flow chart of that process shown in FIG. 15.

In step S200, posture information of each camera is individually calculated. The contents of this process are the same as those of the process that have been explained using the flow chart of FIG. 10 in the first embodiment.

In step S220, the posture information of the virtual panoramic camera is calculated based on those of the respective cameras. The contents of this process are the same as those of the process that have been explained using the flow chart of FIG. 11 in the first embodiment.

In step S240, the posture information of each camera is re-calculated on the basis of that of the virtual panoramic camera. Details of the process will be explained later using the flow chart of that process shown in FIG. 16.

In step S260, a panoramic video is composed by joining video frames sensed by the cameras 1101-1 to 1101-N, after reducing shakiness of those video fames. Details of the process will be explained later using the flow chart of that process shown in FIG. 17. With the above processes, shakiness can be reduced upon generation of a panoramic video.

(Synchronized Camera Posture Information Calculation Process)

Details of an example of the synchronized camera posture information calculation process in step S240 in FIG. 15 will be explained below using the flow chart of that process shown in FIG. 16. This is also a detailed description of the process in the synchronized camera posture information calculation unit 280.

In step S2401, posture information $H_{vm}$ of the virtual panoramic camera in each frame is acquired from the virtual panoramic camera posture information storage unit 270.

In step S2402, m indicating the frame number is set to be an initial value "1". In step S2403, a transform $H_{vm\_s}$ for reducing shakiness of the virtual panoramic camera is calculated from $H_{vm}$.

For example, $H_{vm\_s}$ can be a 4×4 rotation matrix that expresses a posture vector $x_{vm}=(-\theta_{vm}, -\phi_{vm}, -\phi_{vm})$ which is formed based on the roll angle $\theta_{vm}$, pitch angle $\phi_{vm}$, and yaw angle $\phi_{vm}$ obtained from $H_{vm}$. Upon application of such transformation, the posture of the virtual panoramic camera in frame m can be set to be substantially equal to that in frame 1. Note that the yaw angle may not be corrected by setting $x_{vm}=(-\theta_{vm}, -\phi_{vm}, 0)$. In this way, when the image collection system 110 is moving while turning, that turn motion can be prevented from being removed by the shakiness reduction process.

Figure 3:
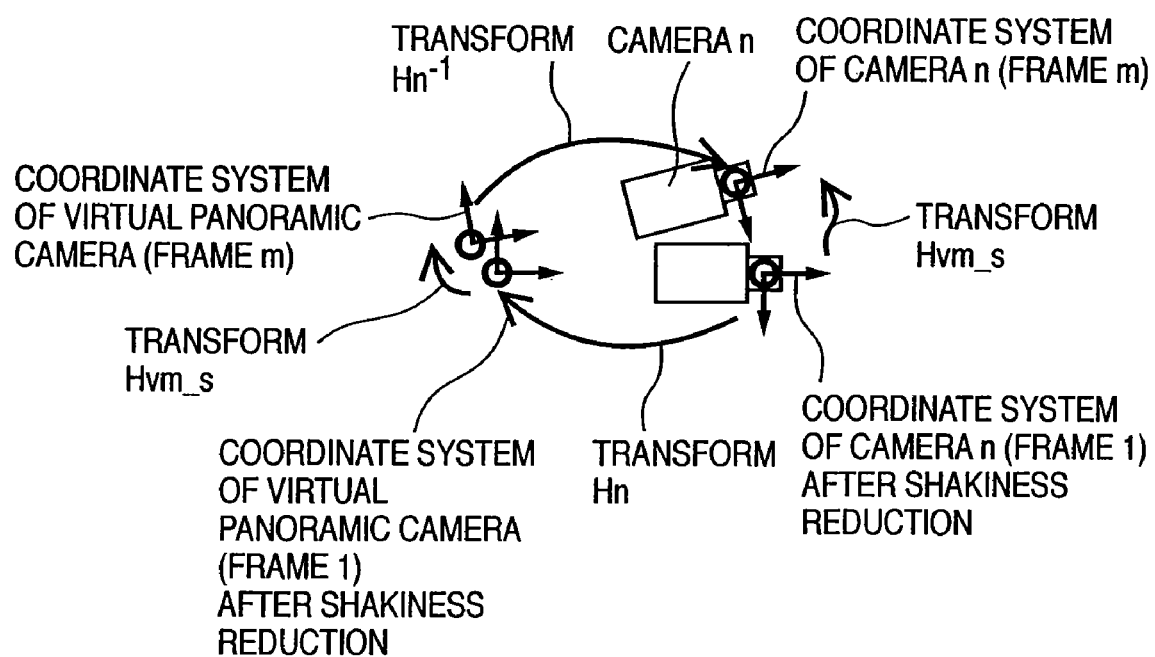
FIG. 3 is a view for explaining transformation for reducing a shakiness of a camera.

In step S2404, n indicating the camera number is set to be an initial value "1". In step S2405, a transform $H_{nm\_s}$ for reducing shakiness of the camera 1101-n is calculated (see FIG. 3). More specifically, $H_{nm\_s}$ can be calculated by:

$$H_{nm\_s} = H_n^{-1} \cdot H_{vm\_s} \cdot H_n$$

Assume that $H_{nm\_s}$ expresses the posture information of the camera 1101-n in this embodiment, since the posture information of the camera 1101-n can be calculated based on $H_{nm\_s}$.

In step S2406, the calculated posture information $H_{nm\_s}$ of the camera is stored in the synchronized camera posture information storage unit 290.

In step S2407, n indicating the camera number is incremented by "1". It is checked in step S2408 if the processes for all the cameras are complete. If NO in step S2408, the flow returns to step S2405.

In step S2409, m indicating the frame number is incremented by "1". It is checked in step S2410 if the processes for all the frames are complete. If NO in step S2410, the flow returns to step S2403. With the above processes, the posture information of each camera in each frame can be calculated.

(Generation of a Stabilized Panoramic Video)

Figure 17:
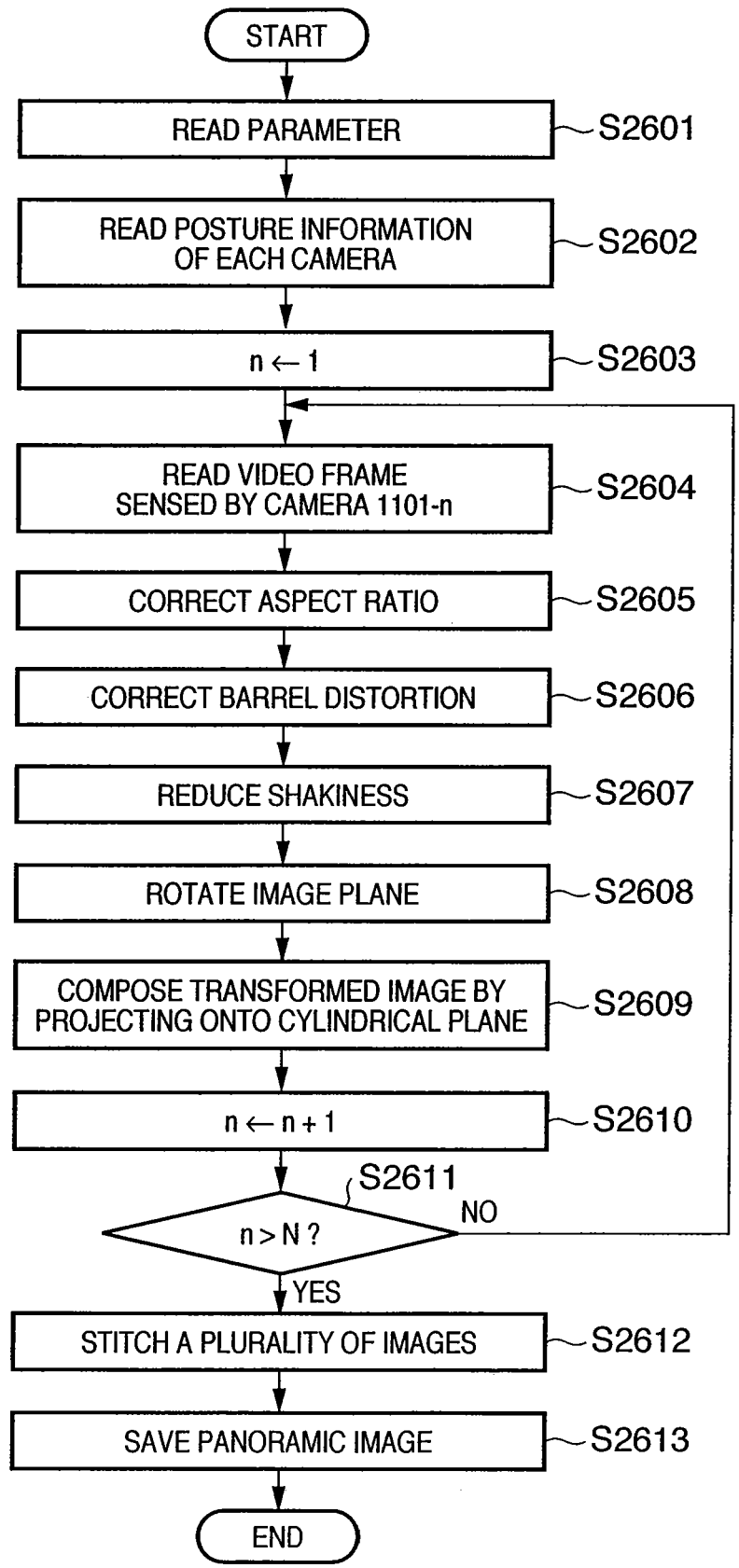
FIG. 17 is a flow chart for explaining a process in a stabilized panoramic video composition unit 300.

Details of an example of the process in step S260 in FIG. 15 will be described below using the flow chart of that process shown in FIG. 17. This is also a detailed description of the process in the stabilized panoramic video composition unit 300. In this embodiment, a stabilized panoramic video is composed by sequentially executing the following processes for a plurality of successive frames.

In step S2601, various parameters used in image correction and panoramic image generation are read from a parameter storage unit (not shown). In step S2602, posture information of each camera in each frame is acquired from the synchronized camera posture information storage unit 290. In step S2603, n indicating the camera number is set to be an initial value "1".

In step S2604, a video frame sensed by the camera 1101-n is acquired from the sensed video storage unit 210. As described above, when the image sensing unit 1101 adopts an arrangement for sensing a vertically elongated video by rolling the camera 1101-n about 90° about the optical axis, the roll angle is adjusted by rolling the acquired video about 90°. On the other hand, when the image sensing unit 1101 adopts an arrangement for reflecting the field of view of the camera 1101-n by a polygonal mirror, the acquired video is inverted.

In step S2605, the aspect ratio of the read image is corrected. In step S2606, lens distortion is corrected. In this embodiment, barrel distortion is corrected.

In step S2607, the transform $H_{nm\_s}$ for reducing shakiness of the camera 1101-n is applied to the image to reduce shakiness.

In step S2608, an image plane is rotated. In step S2609, the image is projected from a plane to a cylindrical surface in accordance with the field angle read from the parameter storage unit (not shown), thus composing a transformed image.

In step S2610, n indicating the camera number is incremented by "1". It is checked in step S2611 if the processes for all the camera images are complete. If NO in step S2611, the flow returns to step S2604.

Finally, in step S2612 N (equal to the number of cameras) transformed images are joined using upper, lower, right, and left shift amounts, a mixing ratio, and the like read from the parameter storage unit (not shown). In step S2613, the composed, stabilized panoramic image is stored in the stabilized panoramic video storage unit 310.

Applying the above processes sequentially to consecutive images, a stabilized panoramic video can be composed.

As described above, according to the third embodiment, the posture information of the virtual panoramic camera is calculated based on those of a plurality of cameras, and shakiness can be reduced using the re-calculation results of the posture information of the plurality of cameras based on that of the virtual panoramic camera upon generation of a panoramic video.

Fourth Embodiment

In the third embodiment, the posture information is formed of three kinds of azimuth information: the roll angle, pitch angle, and yaw angle. This embodiment will explain a case wherein the posture information includes three-dimensional position information in addition to these three kinds of azimuth information.

The flow of the process in the virtual panoramic camera posture information calculation unit 260 in this embodiment is substantially the same as that in the flow chart of the first embodiment shown in FIG. 11. The combining method of posture information of the virtual panoramic camera in step S1208 is different, however, in that it is the same method as is explained in the fourth embodiment.

Figure 16:
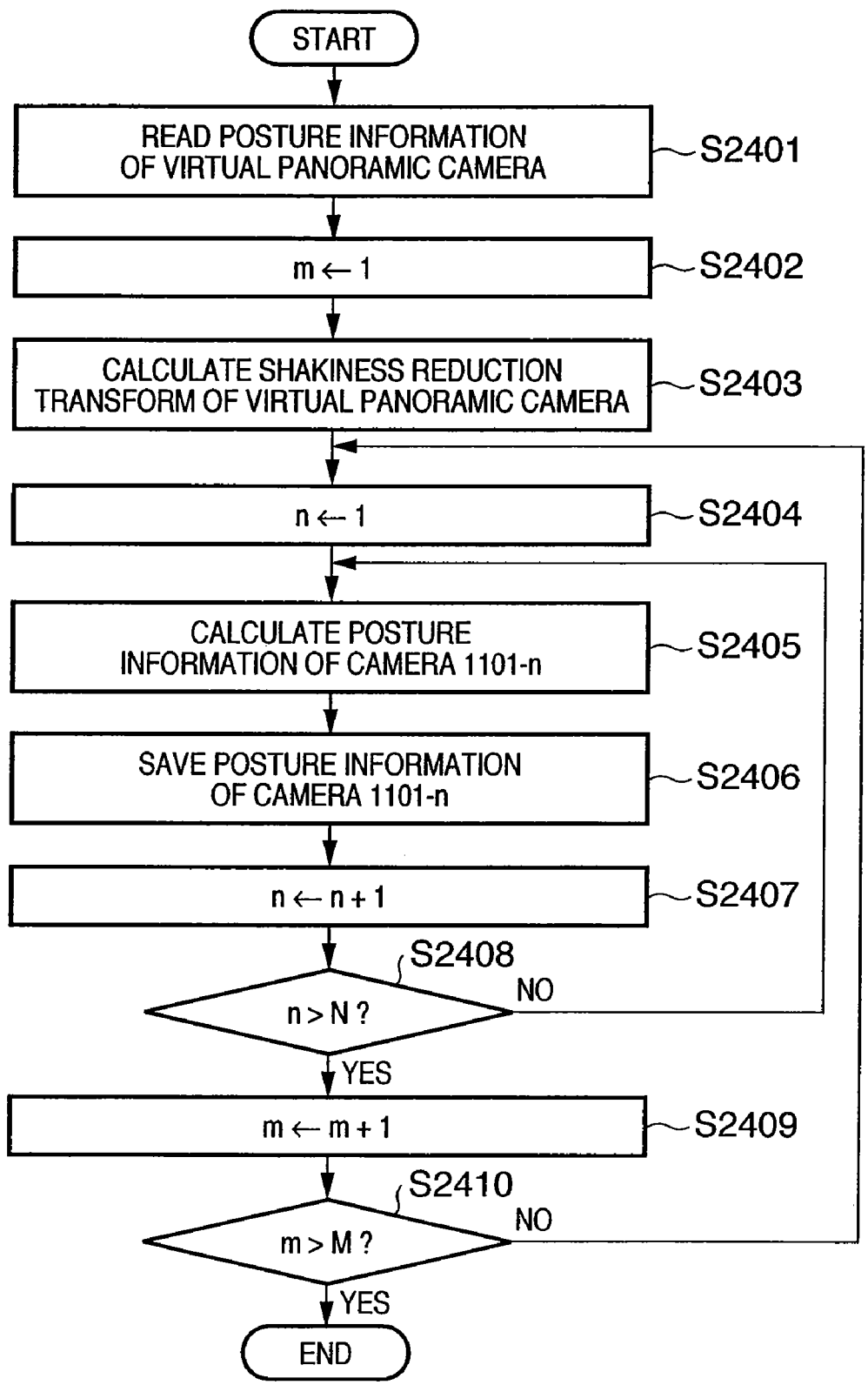
FIG. 16 is a flow chart for explaining a process in a synchronized camera posture information calculation unit 280.

The flow of the process in the synchronized camera posture information calculation unit 280 in this embodiment is the same as that of the flow chart in the third embodiment shown in FIG. 16. The calculation method of the transform $H_{vm\_s}$ for reducing shakiness of the virtual panoramic camera is different, however, in that it is the same method that is described in the second embodiment.

As described above, according to the fourth embodiment, even when three-dimensional position information is included in the posture information, shakiness can be reduced upon generation of a panoramic video.

Fifth Embodiment

In the first to fourth embodiments, shakiness is reduced using the posture information of the camera (virtual panoramic camera or each camera). This embodiment will explain a case wherein a transform is applied to the posture information of the camera, and shakiness is then reduced.

For example, the posture information of the camera (virtual panoramic camera or each camera) may be transformed so that a desired posture can be set in the first and last frames of a video. In this case, the posture information of a frame designated with no posture may be transformed so that a transformation amount changes linearly. For example, let $\theta_1$ be the roll angle of the camera in the first frame, $\theta_M$ be the roll angle in the last frame, $\theta_1'$ be the desired roll angle in the first frame, and $\theta_M'$ be the desired roll angle in the last frame. Then, a transformed roll angle $\theta_m'$ in frame m (m=1 to M) can be expressed by:

$$\theta_m' = \theta_m - \frac{(M-m)(\theta_1' - \theta_1) + (m-1)(\theta_M' - \theta_M)}{M-1}$$

where $\theta_m$ is the roll angle before transformation.

Similar calculation formulas can be used for elements other than the roll angle. Note that the posture information of the camera may be transformed to obtain desired postures in some middle frames. For example, when a scene change to another panoramic video is included, a change in posture upon switching the video can be reduced.

An upper limit may be set for the posture transformation amount $(\theta_m' - \theta_m)$ upon shakiness reduction. As a result, when the posture changes largely, a non-display region of a video can be prevented from becoming too large. For example, assume that the roll angle $\theta_m$ in frame m is transformed into the angle $\theta_m'$ if the transformation amount has no upper limit. In such case, if the upper limit of the transformation amount of the roll angle is set at 5°, a transform value $\theta_m''$ with the upper limit can be expressed by:

$\theta_m'' = \theta_m - 5$ (if $\theta_m' - \theta_m < -5$)

$\theta_m'' = \theta_m'$ (if $|\theta_m' - \theta_m| \leq 5$)

$\theta_m'' = \theta_m + 5$ (if $\theta_m' - \theta_m > 5$)

Alternatively, when the maximum value of the transformation amount is 12°, a transform value $\theta_m''$ with the upper limit may be calculated by:

$$\theta_m'' = \theta_m + (\theta_m' - \theta_m) \times \frac{5}{12}$$

Of course, elements other than the roll angle can be obtained by similar calculation formulas.

To achieve the same object as above, only a high-frequency component of shakiness may be reduced in place of reducing all shakiness components. For example, the high-frequency component can be calculated by dividing the calculated transformation amount by the weighted average of the transformation amounts of several frames before and after the frame of interest.

As described above, according to the fifth embodiment, since the posture information of each camera is transformed, and shakiness is then reduced, the display quality of a panoramic video can be improved.

Other Embodiments

The image processing method explained in each of the above embodiments may be implemented by either a processing apparatus which comprises a single device, or a system which comprises a plurality of devices.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for generating a panoramic image from a plurality of images obtained by a respective plurality of image sensing devices, wherein the plurality of image sensing devices are located to have fixed relative positions, said method comprising the steps of:
    calculating first transform conditions, each of which is for transforming an orientation of a respective one of the plurality of image sensing devices at a target image frame into an orientation at a predetermined image frame which is different from the target image frame;
    obtaining second transform conditions, each of which corresponds to a respective one of the plurality of image sensing devices, based on each of coordinate systems of the image sensing devices and a coordinate system of a virtual image sensing device;
    calculating, for each of the image sensing devices, a respective orientation of the virtual image sensing device at the predetermined image frame based on the first and second transform conditions;
    calculating, based on the calculated orientations of the virtual image sensing device, correction transforms each of which is for reducing a shakiness of respective image sensing devices at the target image frame;
    composing a panoramic image using images sensed at the target image frame by the plurality of image sensing devices; and
    displaying the panoramic image by applying the correction transforms.

2. The method according to claim 1, wherein the correction transforms are calculated based on a weighted average of the orientations of the virtual image sensing device calculated for the respective image sensing devices.

3. The method according to claim 1, wherein the correction transforms correct roll and pitch angles.

4. The method according to claim 1, wherein the correction transforms correct yaw, roll and pitch angles.

5. An image processing apparatus for generating a panoramic image from a plurality of images obtained by a respective plurality of image sensing devices, wherein the plurality of image sensing devices are located to have fixed relative positions, said apparatus comprising:
    means for calculating first transform conditions, each of which is for transforming an orientation of a respective one of the plurality of image sensing devices at a target image frame into an orientation at a predetermined image frame which is different from the target image frame;
    means for obtaining second transform conditions, each of which corresponds to a respective one of the plurality of image sensing devices, based on each of coordinate systems of the image sensing devices and a coordinate system of a virtual image sensing device;
    means for calculating, for each of the image sensing devices, a respective orientation of the virtual image sensing device at the predetermined image frame based on the first and second transform conditions;
    means for calculating, based on the calculated orientations of the virtual image sensing device, correction transforms each of which is for reducing a shakiness of respective image sensing devices at the target image frame;
    means for composing a panoramic image using images sensed at the target image frame by the plurality of image sensing devices; and
    means for displaying the panoramic image by applying the correction transforms.

6. A computer-readable storage medium storing a computer program for effecting the method according to claim 1.

* * * * *